(12) United States Patent
Raduchel et al.

(10) Patent No.: US 6,418,444 B1
(45) Date of Patent: Jul. 9, 2002

(54) METHOD AND APPARATUS FOR SELECTIVE EXCUTION OF A COMPUTER PROGRAM

(75) Inventors: William J. Raduchel, Palo Alto; Glenn C. Scott, Mountain View; Timothy G. Lindholm, Palo Alto, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 08/988,659

(22) Filed: Dec. 11, 1997

(51) Int. Cl.[7] .............................................. G06F 17/00
(52) U.S. Cl. ..................... 707/103 Z; 709/315; 713/153
(58) Field of Search ........................... 714/38; 713/201; 709/100–332; 707/1–206; 213/150–181

(56) References Cited

U.S. PATENT DOCUMENTS

| | | | |
|---|---|---|---|
| 5,668,999 A | | 9/1997 | Gosling ....................... 717/126 |
| 5,761,669 A | * | 6/1998 | Montague et al. .......... 707/103 |
| 5,778,222 A | * | 7/1998 | Herrick et al. .............. 707/103 |
| 5,778,227 A | * | 7/1998 | Jordan ........................ 707/103 |

FOREIGN PATENT DOCUMENTS

EP 0778520 A2 6/1997

OTHER PUBLICATIONS

Zalenski, "Firewall Technologies", IEEE Potentials, vol. 21, Issue 1, Feb.–Mar., 2002, pp. 24–29.*

Gutzmann, "Access control and session management in the HTTP environment", IEEE Internet Computing, vol. 5, Issue 1, Jan.–Feb. 2001, pp. 26–35.*

Fan et al., "The Raincore API for clusters of networking elements", IEEE Internet Computing, vol. 5, Issue 5, Sep.–Oct. 2001, pp. 70–76.*

Kara, "Secure remote access from office to home", IEEE Communications Magazine, vol. 39, Issue 10, Oct. 2001, pp. 68–72.*

100% Pure Java Cookbook for Java Developers Version 5.30, Rules and Hints for Maximizing the Portability of Java Programs, pp. 1–34.

Article by Bruce Eckel, entitled "Java Alley, Java 1.1 Overview" Jun. 1997, p. 36 and 38.

Web Page for Amended Complaint URL=http://java.sun-.com/aboutJava/info/complaint.html, 32 pages, publication date unknown.

Web Page for "Java PureCheck" software URL=http://www.suntest.com/100percent/cpd/doc/tools/jpc.html, 11 pages, Copyright 1997.

Web Page for 100% Pure Java Certification Tools URL= http://www.suntest.com/100percent/tools.html, 1 page, publication date unknown.

Web Page for JDK11 System Model URL=http://www-.suntest.com/100percent/cpd/doc/tools/jdk11.html, 7 pages, publication date unknown.

Web Page for CS650 entitled "Introduction" URL=http://www.pa.uky.edu/~sorokin/cs650/introduction.html, 1 page, publication date unknown.

Web Page for ISE Eiffel in a Nutshell URL=http://www.e-iffel.com/eiffel/nutshell.html, 15 pages, Copyright 1996.

(List continued on next page.)

*Primary Examiner*—David Jung
(74) *Attorney, Agent, or Firm*—Beyer Weaver & Thomas, LLP

(57) ABSTRACT

A method and apparatus for ensuring that code being executed by a data processing system conforms to a platform standard. As an example, one embodiment of the present invention validates Pure Java platform standard conformance of Java programs downloaded from a remote server to ensure that they conform to the "Pure Java" standard. This checking can be performed at the time that the program is downloaded across a network firewall and/or at one or more times during the loading and execution of the program.

46 Claims, 14 Drawing Sheets

OTHER PUBLICATIONS

Web Page for Technology and Standards: The Eiffel Language URL=http://www.computerwire.com/bulletins/oo3125.htm, 7 pages, Copyright 1996.

Web Page for Beyond Eiffel/BON Ongoing Research URL= http://www.comp.it.bton.ac.uk/academic_activity/research/projects/stuart.kent.1 . . . , 2 pages, "issue date"; Jul. 1, 1996.

Web Page for Dr. Beidler's Ada Page entitled "Jack Beidler's Ada Page, Home of the First (and Second Ada(95)) Data Structures Suites" URL=http://www.academic.uofs.edu/faculty/beidler/ada/ada.html, 4 pages, publication date unknown.

Web Page for Assertions for the Tcl Language URL=http://www.cs.colorado.edu/~jcook/papers/AsserTcl.html, 11 pages, Mar. 11, 1997.

Gary Cornell, Cay S. Horstmann, *Core Java*, $2^{nd}$ Edition, Ch. 17 "Survey of Future Directions for Java" pp. 726–735 (1997).

Web Page for Sun Test: 100 Percent Pure Java at Sun Test URL=http://www.suntest.com/100percent/, 3 pages, publication date unknown.

Web Page for JavaOne Session Slides URL=http://www-.java.sun.com/javaone/sessions/slides/TT32/, 41 pages, Apr. 2–4, 1997, Moscone Convention Center, San Francisco, California.

Web Page for Suntest FAQ URL=http://www.suntest.com/100percent/faq.html, 2 pages, publication date unknown.

Web Page for 100% Pure Java Certification Guide URL: http://www.suntest.com/100percent/cpd/doc/pjcg/pjcg.html, 19 pages, Jul. 17, 1997.

100% Pure Java Cookbook for Java Developers, Rules and Hints for Maximizing the Portability of Java Programs, Revision Jul. 24, 1997, 57 pages.

Web Page entitled "How to Avoid Potential Pitfalls of Microsoft . . . ," John Zukowski URL: http://www.javaworld.com/javaworld/jw–Nov. 1997/jw–11–pitfalls.html, publication date unknown, 12 pages.

Web Page for 100% Pure Java Certification Guide URL= http://www.suntest.com/100percent/cert–guide.html, one page, publication date unknown.

Web Page JDK102 System Model URL=http://www-.suntest.com/100percent/cpd/doc/tools/jdk102.html, five pages.

Martin, et al., Blocking Java Applets at the Firewall, 1997, IEEE.

\* cited by examiner

Development System/Compiler

Development System/Compiler

Java Classes

In the Firewall

In the Runtime Environment

In the Runtime Environment

In the Runtime Environment
(checks at load time for each class)

In the Runtime Environment
(checks at run time)

Implemented
in hardware

Implemented in
hardware
(with signatures)

METHOD AND APPARATUS FOR SELECTIVE EXCUTION OF A COMPUTER PROGRAM

FIELD OF THE INVENTION

This application relates to a method and apparatus for executing computer programs and, specifically, to a method and apparatus that ensures that a computer program being downloaded and/or executed conforms to a programming platform standard.

BACKGROUND OF THE INVENTION

Computer programs are usually written in some type of "high level language" such as Java, C++ or Visual Basic. ("Java" is a trademark or registered trademark in the United States and other countries of Sun Microsystems, Inc.) High level languages are more easily understood by human beings than are programs written in the machine language understood by computers.

Some high level languages are designed to be executed in a runtime environment, such as the Java runtime environment. Such an environment is often called a "platform." Such a platform will often have a standard API (Application Program Interface). A "platform standard" defines, for example, what is an allowable class or method in the language and what is not. A platform standard also defines what kinds of actions the program can take. For example, the Java programming language was developed by Sun Microsystems, Inc. Sun Microsystems, Inc. has recently defined a platform standard known as "Pure Java." Pure Java programs are programs that adhere to the Pure Java standard. Even though a particular class or method may be syntactically allowable by the Java language specification, it may not be allowed by the Pure Java compatibility test suite. For example, "extensions" to the Java API may not conform to "Pure Java."

A program that does not conform to the Pure Java standard can pose risks to a computer system. For example, such a program may allow computer viruses to infiltrate the system. As an example, the Java language generally allows the execution of "native" code (i.e., code written in a programming language other than Java) from within a Java program. Such native code can include a virus program capable of escaping from the Java runtime environment into other portions of the computer memory and storage media. Such viruses could corrupt a user's hard drive, overflow the program stack, or perform similar types of damage, either intentionally or unintentionally. It is desirable to ensure that such damage does not occur. Thus, in the Pure Java standard, the user is not allowed to write calls to native methods.

Another risk is that a program not written in Pure Java is not guaranteed to be cross-platform compatible. A program written in Pure Java will run on any system with a Java runtime environment. A program that is not written in Pure Java may not run on all Java runtime environments.

Most conventional browsers for the World Wide Web allow a user to execute computer programs from within a Web page being viewed by the user. For example, if the user is using a Java-enabled browser to view a Web page and the user visits a Web page incorporating a Java applet, the browser causes the Java applet to be downloaded from a remote computer and executed by a Java runtime environment within the browser.

Current Java-enabled browsers include Netscape Communicator and Netscape Navigator, available from Netscape Communications Corporation and Internet Explorer, available from Microsoft Corporation.

SUMMARY OF THE INVENTION

Embodiments of the present invention provide a method and apparatus for ensuring that code being executed and/or loaded by a computer conforms to a platform standard. As an example, one embodiment of the present invention validates Pure Java platform standard conformance of Java programs downloaded from a remote server to ensure that they conform to the "Pure Java" platform standard. This checking can be performed at the time that the program is downloaded across a network firewall and/or at one or more times before and during the execution of the program.

In accordance with one embodiment of the invention, program code that conforms to the "Pure Java" platform standard should contain an indication within the code that the code conforms to the platform standard. In the described embodiment, whenever a computer program ("files" or "code") is downloaded across a firewall, the firewall checks to ensure that all code crossing the firewall contains such an indication. Code that does not indicate conformance with the Pure Java standard is not passed through the firewall. The runtime environment optionally also performs a similar check.

In addition, in another embodiment of the present invention, the runtime environment performs yet another check for each loaded file or class before execution. Alternatively, the runtime environment can check to ensure that every class, function, method, instruction (e.g., each instruction of the Java virtual machine, byte code, or p-code), or each group of instructions contains an indication of conformance to the Pure Java standard before execution.

Of course, unscrupulous code producers can indicate that their code conforms to the standard when, in fact, it does not. A check to determine whether a program alleges conformance will not catch "dishonest" code producers. Thus, another embodiment of the present invention also performs an additional runtime check of the code. This runtime check can be a static check prior to code execution. Alternately, a semantic check can be performed at predetermined times during program execution. Various embodiments of the present invention perform a runtime check at various points. Such checks are performed, for example, at any or all of the following: prior to loading a main class, prior to loading each class, prior to executing a main method, prior to executing each method, and prior to executing each instruction.

In yet another embodiment, "runtime" checking can also be done in the firewall, as long as it does not appreciably affect the performance of the firewall.

Another embodiment of the present invention allows validation of conformance of Java applications that are loaded into a machine in some way other than via a network. Such an embodiment may not include a check at the firewall, since the application may be loaded into the machine from a non-networked source. For example, a Web browser can be used to view local files (i.e., files resident on the same machine as the browser) that include Java instructions or applets. Because such instructions or applets may not have entered through the firewall, it is desirable to duplicate the check for indication of conformance during run time.

In accordance with the purpose of the invention, as embodied and broadly described herein, the invention relates to a method of verifying that a computer program written in a programming language conforms to a platform standard for the programming language, comprising the steps, performed by a data processing system of: receiving the computer program, by a firewall of the data processing system; determining, by the firewall, that the received computer program is a computer program of a type to be checked for conformance; determining whether the computer program contains an indication that it conforms to the platform standard; and passing the computer program through the firewall only when the computer program contains an indication that it conforms to a platform standard.

In further accordance with the purpose of the invention, as embodied and broadly described herein, the invention relates to a method of verifying that an application program written in a programming language conforms to a platform standard for the programming language, comprising the steps, performed by a data processing system of: receiving the application program, by an execution environment of the data processing system; from a source outside the execution environment; determining, by the execution environment, whether the application program contains an indication that it conforms to the platform standard; and executing the application program, by the execution environment, only when the execution environment determines that the application program contains an indication that it conforms to the platform standard.

A fuller understanding of the invention will become apparent and appreciated by referring to the following description and claims taken in conjunction with the accompanying drawings.

BRIEF DESCRIPTION OF THE DRAWINGS

The accompanying drawings, which are incorporated in and constitute a part of this specification, illustrate several embodiments of the invention and, together with the description, sever to explain the principles of the invention.

DETAILED DESCRIPTION OF PREFERRED EMBODIMENTS

Figure 1:
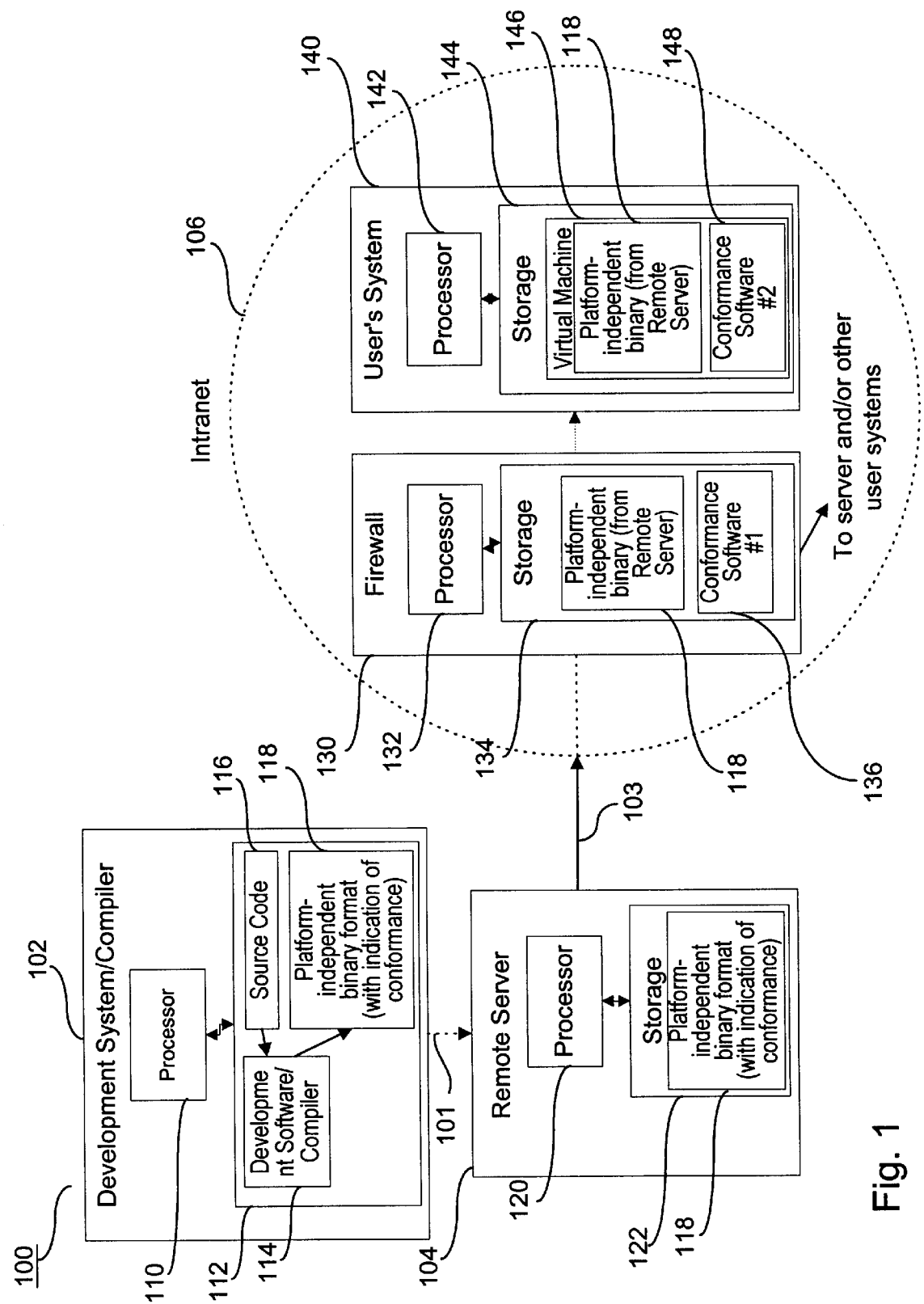
FIG. 1 is a block diagram of a computer system in accordance with one embodiment of the present invention.

The following paragraphs describe one embodiment of the present invention that validates Pure Java platform standard conformance of Java programs received by a network firewall over a network and subsequently sent to a Web browser behind the firewall. Where convenient, the same reference numbers will be used to the same or like parts.

It will be understood that the present invention can be adapted for programming languages other than Java and for other platform standards than Pure Java and can be implemented using a variety of programming techniques without departing from the spirit of the invention. For example the present invention can be implemented to validate conformance of Java computer programs received from sources other than the network, such as a file in the local file system, that did not enter through the network. Furthermore, it will be understood that the present invention can be used to validate conformance of computer programs written in other programming languages, such as C, C++, and Visual Basic. Embodiments of the present invention can also be used to monitor conformance to a platform standard such as Microsoft's ActiveX component platform.

I. An Example of a Platform Standard

Prior to discussing details of a one embodiment of the present invention, it is important to discuss the difference between portability and conformance to a platform standard (such conformance is also called "purity"). All pure computer programs are portable, but not all portable computer programs are pure. For example, a portable Java program can be run on various types of computer systems without alteration, while producing the same results and without abnormally terminating. In contrast, a "pure" Java program depends only on the standard Java platform (i.e., on standard Java APIs). The purpose of purity is not only to ensure portability, but to minimize security risks associated with syntactically permitted, but potentially dangerous features of the language. A program that has been validated as conforming to the platform standard (i.e., to be "pure") has a smaller chance of introducing security flaws during its execution.

This document does not provide details of the syntax and semantics of the Java programming language and does not provide details of the Java runtime execution environment. Such details are generally known to persons of ordinary skill in the art. A description of relevant portions of the Java programming language and its execution environment can be found in J. Gosling, B. Joy & G. Steele "The Java Language Specification" (http://java.sun.com/docs/books/jsl/index.html), in changes for Java 1.1, as described in "The Java Programming Language" by Ken Arnold and James Gosling, Addison-Wesley, 1996, ISBN 0-201-63455-4, and in "Clarifications and Amendments to the Java Language Specification" (http://java.sun.com/docs/books/jls/clarify.html). Each of these documents is herein incorporated by reference in their entirety. The architecture of the Java runtime environment and the binary file format for compiled Java programs is further defined in T. Lindholm & F. Yellin, "The Java Virtual Machine Specification" (http://java.sun.com/docs/books/vmspec/html/VMSpecTOC.doc.html), which in herein incorporated by reference in its entirety.

In this document a "conforming" or "pure" computer program is defined as a self-contained set of classes that have external dependencies only on the Java platform. Examples of Java computer programs include an application, an applet, a class library, a servlet, a JavaBean, or more than one of the above.

In general, at the time that this document was prepared, the platform standard for the Java programming language (currently called "100% Pure Java") implements several basic principles. Other principles may be added, or these principles may be modified in subsequent versions of the platform standard. In general, conformance to a platform standard can be checked by checking a predetermined set of properties, some of which can be statically checked (prior to execution) and some of which can be only dynamically checked (i.e., at run time). These properties can be properties, such as those discussed herein, that are specific to the 100% Pure Java platform standard. They can also be any other appropriate properties for other platform standards.

The principles on which the current Java platform standard for programs are based include:

1) No Native Methods

Native methods are methods written in a programming language other than Java. Attempting to introduce native code into a Java program may result in the sacrifice of most of the benefits of Java, i.e., in sacrifice of security, platform independence, garbage collection, and easy class loading over the network.

For users, the security issues of software that mixes Java and native method definition are substantial. There is no assurance possible via runtime checking that the code is virus-free. Moreover, if a native method has a pointer overrun or attempts to access protected memory, it can crash the Java Virtual Machine, possible corrupting and certainly interrupting the user's work.

2) No External Dependencies Aside from the Java Platform Application Program Interfaces (APIs)

The Java platform APIs are a standard foundation for Java programs and are essentially a basis for application development. The Pure Java platform standard requires that applications depend only on classes and interfaces documented in the Java platform API specification.

The Java platform APIs provide the basic language, utility, I/O, network, GUI, and applet services. Vendors who have licensed Java have contracted to include these in any Java platform they deploy. The specification for standard Java APIs is available on the World Wide Web at: http://java.sun.com and is herein incorporated by reference in its entirety.

3) No Use of Undocumented Parts of a Java Implementation

Any implementation of the Java platform APIs will include classes and packages that are not part of the documented API, but are used to implement the documented APIs. Portable programs must not depend on these implementation details, as they may vary between different Java platform implementations. This is true even if the classes in question are undocumented parts of the reference Java platform implementation from Sun Microsystems, Inc. Those interfaces are not part of the Java platform definition, and they are not checked by the tests for Java platform compatibility, so they may be absent or may behave in subtly and dangerously different ways on different Java platform implementations. They are not documented and are not intended for client use.

One subtle way that a program may depend on implementation details is by defining classes in the packages that are part of the Java platform APIs. This breaks protection boundaries that the Java platform implementers are entitled to count on.

Another subtle dependency on implementation details is direct use of the AWT (Abstract Window Toolkit) component peer interfaces defined in classes in the java.awt.peer package. These interfaces are documented as being for "use by AWT implementers." A portable program uses the AWT, rather than the interfaces implementing it.

4) No Use of "Tunnel" Methods

Certain features of the conventional Java language definition give the Java programmer access to hardware-specific code such as native method definitions, and some methods in the class java.lang.Runtime. While this hardware access is very useful for writing programs that interface to legacy systems, such interface programs are by definition not in conformance with the Pure Java platform standard. Not every "good" program conforms to the Java platform standard.

There is a loophole in Rule 4. The use of the Runtime.exec method is allowed if it is at the behest of the user of the program. The Runtime.exec method is not generally portable, i.e., not all platforms have applications that can be run and not all platforms have the notion of "standard input" or "standard output." Use of this method is still allowed, however, under certain conditions. For example, a command interpreter that executes programs named in the user's input could be written in Pure Java. Another example is the invocation of an external program with a specific function, such as a Web browser, as long as the user has control of which browser gets invoked. The exact criteria for use of the Runtime.exec method are:

a) The invocation must be a direct result of a specific user action. The user must know that they are executing a separate program.

b) The user must be able to choose, by configuration or as part of the invocation action, which program gets executed.

c) A failure of the Runtime.exec method, especially one caused by the absence of the requested program, must be handled cleanly.

5) No Hardwired Platform-specific Constraints

The java.io.File class can be used in an unportable way, by constructing files using a platform-specific path constant.

Similarly, input and output streams can be used unportably, with hard-coded and hardware-specific termination characters. Fortunately, it is easy to avoid these sources of unportability, as the Java platform APIs provide portable alternatives.

The five principles listed above and other details concerning a current definition of the "Pure Java" standard are found in the "100% Pure Java Cookbook" available from Sun Microsystems, Inc., which can be found at:

http://www.suntest.com/100percent/cookbook.html and which is herein incorporated by reference in its entirety. The "Cookbook" also includes an example list of approved Pure Java classes, which is expressly herein incorporated by reference in its entirety The certification process for a current version of the Java programming language is outlined in further detail in the "100% Pure Java Certification Guide," which is available from Sun Microsystems, Inc. and can be found at:

http://www.suntest.com/100percent/cert-guide.html and which is herein incorporated by reference in its entirety.

II. Description of One Embodiment Implemented for the Java Language

The following paragraphs describe an embodiment of the present invention used to validate conformance of Java programs (e.g., applets, applications, classes, servlets, etc.) against a predetermined platform standard The predetermined platform standard validated in the described embodiment is the "Pure Java" platform standard.

FIG. 1 is a block diagram of a data processing system embodying one embodiment of the present invention. In FIG. 1, data processing system 100 includes a development system 102, a remote server 104, and an intranet 106. In FIG. 1, development system 102 is connected to remote server 104 via a connection 101 that can be any appropriate type of connection for transferring software from development system 102 to remote server 104, such as a hardware channel, the internet, an intranet, some other type of network etc. (Software can also be transferred to remote server 104 manually or by any other appropriate method). Remote server 104 is connected to intranet 106 via a network connection 103, such as the internet. Any appropriate connection can be used to connect remote server 104 to intranet 106.

Development system 102 includes a processor 110 and a storage area 112 (such as a memory). Storage area 112 includes development system software 114, such as a Java compiler. Storage area 112 also includes source code 116 for a computer program and platform-independent binaries (e.g., Java class files) 118 produced by compiler 114 from the source code. These platform-independent binaries can be generated in such a way as to contain an indication of whether the plafform-independent binaries conform to a platform standard (such as the 100% Pure Java standard). This indication of conformance is placed in the plafform-independent binaries as described below. In general, compiler 114 generates the indication of conformance when it detects that the code conforms or when a programmer/user indicates that the code conforms. Further details of compiler 114 will be described below. Note that the invention can also be used with non-platform independent binaries, such as Active X.

Remote server 104 includes a processor 120 and a storage area 122 (such as a memory). Storage area 122 includes plafform-independent binaries 118 (e.g., loaded from development system 102). Storage area 122 also includes software (not shown) for communicating with network connection 103.

Intranet 106 includes a firewall 130 and a runtime environment 140 (also called a "user system"). Firewall 130 includes a processor 132 and a storage area 134. Storage area 134 includes platform-independent binaries 118 (after the binaries 118 have been loaded from remote server 104) and conformance software 136, which is described in detail below. Runtime environment 140 includes a processor 142 and a storage area 144. Storage area 144 includes plafform-independent binaries 118 (after the binaries 118 have been loaded from remote server 104 via firewall 130) and conformance software 148, which is described in detail below.

It should be understood that the system of FIG. 1 is shown for purposes of example only. Other systems embodying the present invention may include various numbers of firewalls or user systems. Alternately, the development system need not be physically connected to the remote server.

Furthermore, a person of ordinary skill in the art will understand that systems 102, 104, and 106 may also contain additional information, such as input/output lines; input devices, such as a keyboard, a mouse, and a voice input device; and display devices, such as a display terminal. One or more of systems 102, 104, and 106 may also include an input device, such as a floppy disk drive, CD ROM reader, or DVD reader, that reads computer instructions stored on a computer readable medium, such as a floppy disk, a CD ROM, or a DVD drive. Systems 102, 104, and 106 also may include application programs, operating systems, data, etc., which are not shown in the figure for the sake of clarity. It also will be understood that systems 102, 104, and 106 can also include numerous elements not shown, such as disk drives, keyboards, display devices, network connections, additional memory, additional CPUs, LANs, input/output lines, etc.

In the following discussion, it will be understood that the steps of methods and flow charts discussed preferably are performed by an appropriate one of processors 110, 120, 132, or 142 (or similar processors) executing instructions stored in their respective memories (or other appropriate memories). It will also be understood that the invention is not limited to any particular implementation or programming technique and that the invention may be implemented using any appropriate techniques for implementing the functionality described herein. The invention is not limited to any particular programming language or operating system.

The instruction in memory may be read into memory from a computer-readable medium. Execution of sequences of instructions contained in main memory causes one of the processors to perform the process steps described herein. In alternative embodiments, hard-wired circuitry may be used in place of or in combination with software instructions to implement the invention. Thus, embodiment of the invention are not limited to any specific combination of hardware circuitry and software.

The term "computer-readable medium" as used herein refers to any medium that participates in providing instructions to a processor for execution. Such a medium may take many forms, including but not limited to, non-volatile media, volatile media, and transmission media. Non-volatile media includes, for example, optical or magnetic disks, such as a storage device. Volatile media includes dynamic memory. Transmission media include coaxial cables, copper wire and fiber optics, including the wires that comprise a bus within a computer. Transmission media can also take the form of acoustic or light waves, such as those generated during radio-wave and infra-red data communications.

Common forms of computer-readable media include, for example a floppy disk, a flexible disk, a hard disk, magnetic tape, or any other magnetic medium, a CD-ROM, any other optical medium, punchcards, papertapes, any other physical medium with patterns of holes, a RAM, a PROM, an EPROM, a FLASH-EPROM, any other memory chip or cartridge, a carrier wave as described hereafter, or any other medium from which a computer can read.

Various forms of computer readable media may be involved in carrying one or more sequences of one or more instructions to a processor for execution. For example, the instructions may initially be carried on a magnetic disk of a remote computer. The remote computer can load the instructions into its dynamic memory and send the instructions over a telephone line using a modem. A modem local to the computer system can receive the data on the telephone line and use an infra-red transmitter to convert the data to an infra-red signal. An infra-red detector coupled to a bus can receive the data carried in the infra-red signal and place the data on the bus. The bus carries data to main memory, from which a processor retrieves and executes the instructions. The instructions received by main memory may optionally be stored on a storage device either before or after execution by a processor.

Figure 2:
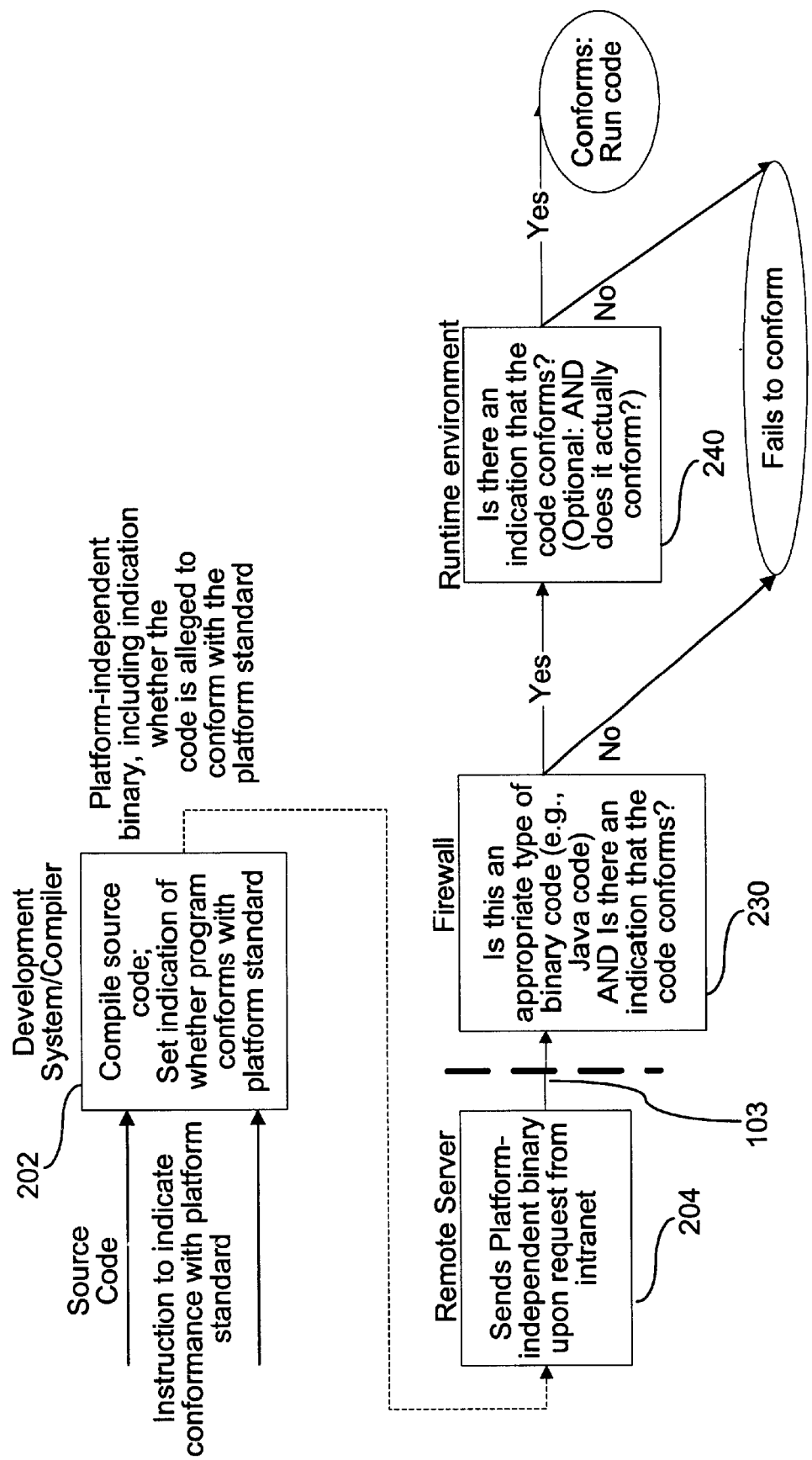
FIG. 2 shows steps performed by a development system, a remote server, and a runtime system in accordance with one embodiment of the present invention.
Figure 4A:
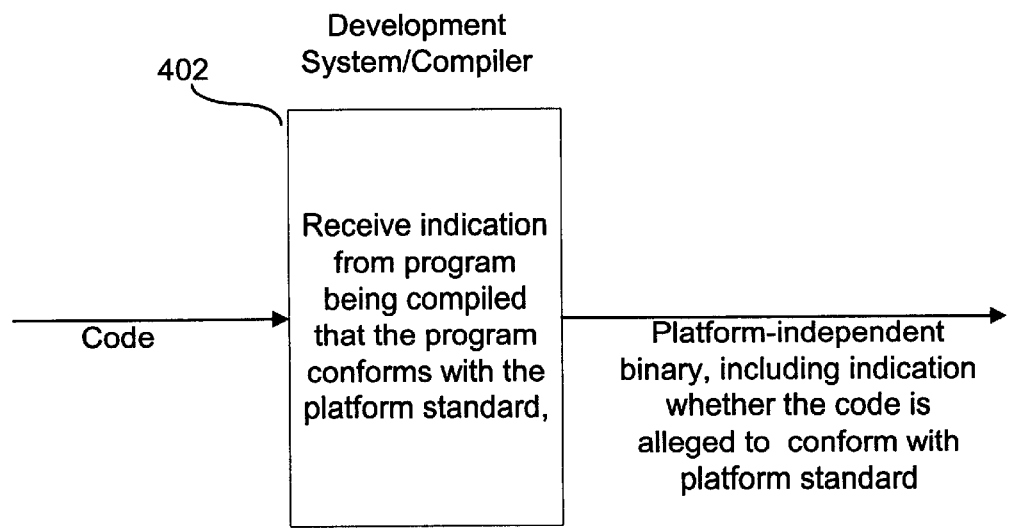
FIG. 4(a) shows steps performed by a development system to set an indicator of code conformance in accordance with one embodiment of the present invention.
Figure 4B:
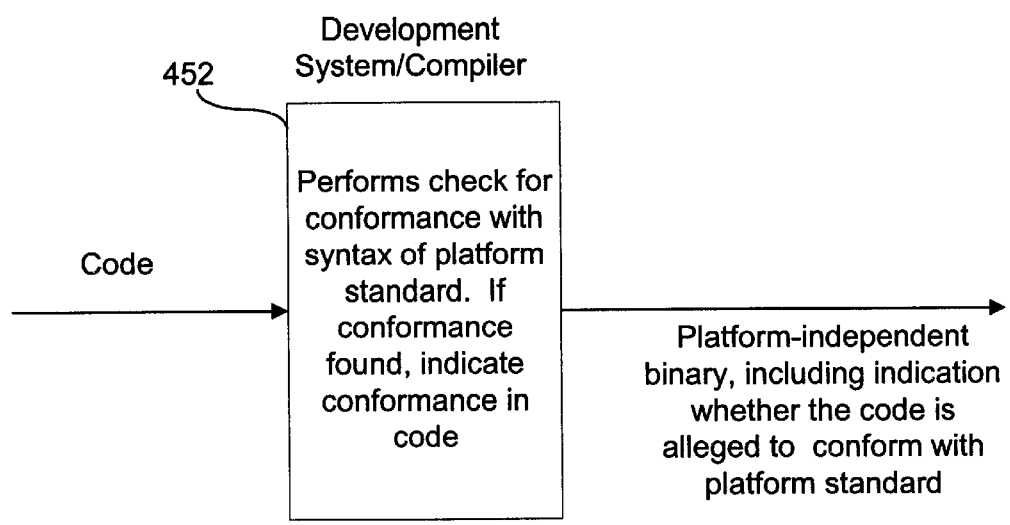
FIG. 4(b) shows steps performed by a development system to set an indicator of code conformance in accordance with one embodiment of the present invention.

FIG. 2 shows steps performed by development system 102, remote server 104, and user intranet 106 in accordance with one embodiment of the present invention. As shown in the Figure, during the development process, in step 202, development system 102 receives source code written, for example, in the Java language. Also received is an instruction from, for example, a human user, that instructs compiler 114 to indicate platform independence in the binary code 118 output by the compiler. Thus, a human programmer directs the tool, compilation by compilation, instructing it whether to indicate conformance with the standard. (Alternatively, compiler 114 can infer the conformance of the code, as shown in FIG. 4(b)). Such an indication indicates that the binary code conforms to some specific programming platform standard, such as the "Pure Java" standard. The indication indicates that the binary code conforms to one platform standard (or to one standard that is backward compatible with other standards). Certain embodiments contain a plurality of indicators of conformance with various respective platform standards.

Figure 5A:
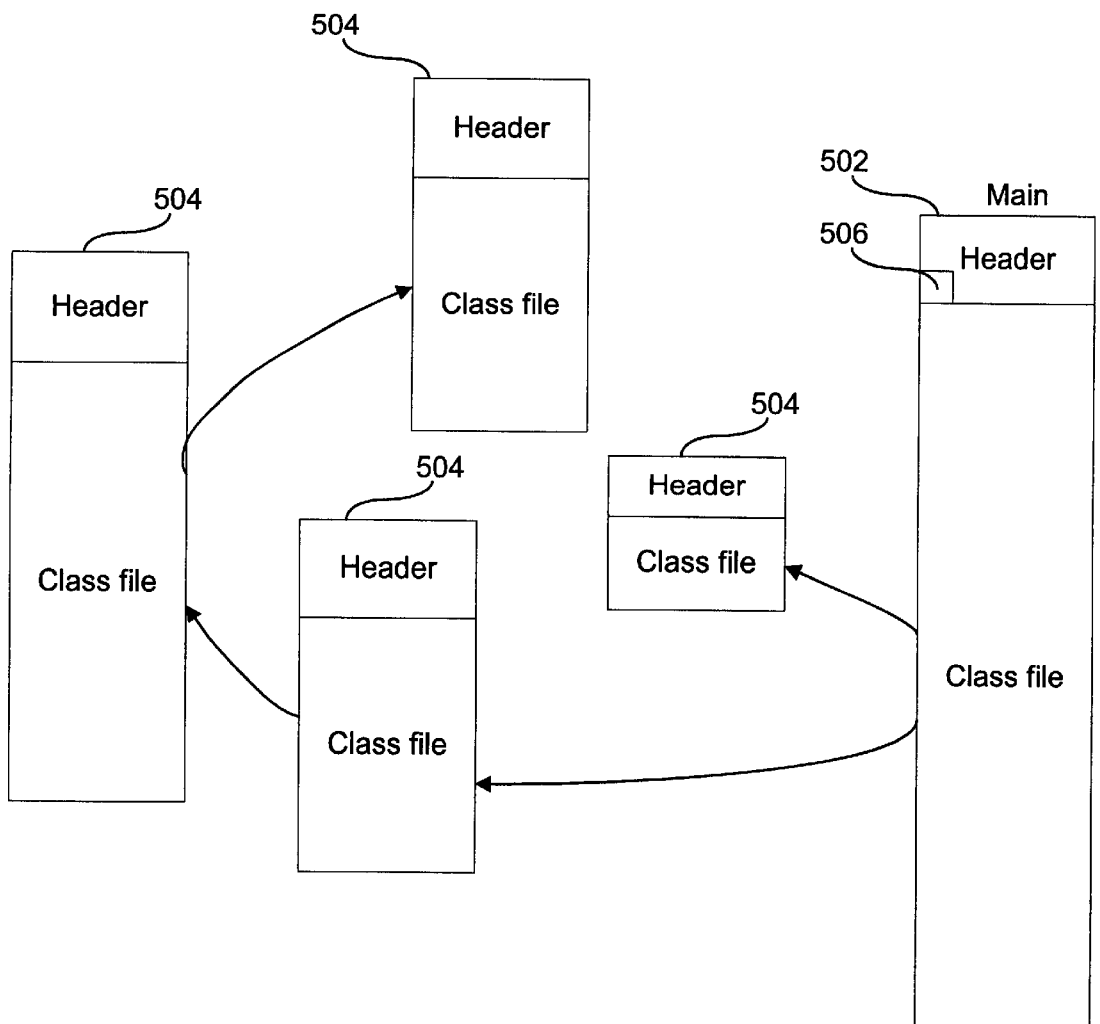
FIG. 5(a) is a diagram of a plurality of Java classes, where a main class includes a conformance indicator in accordance with one embodiment of the present invention.
Figure 5B:
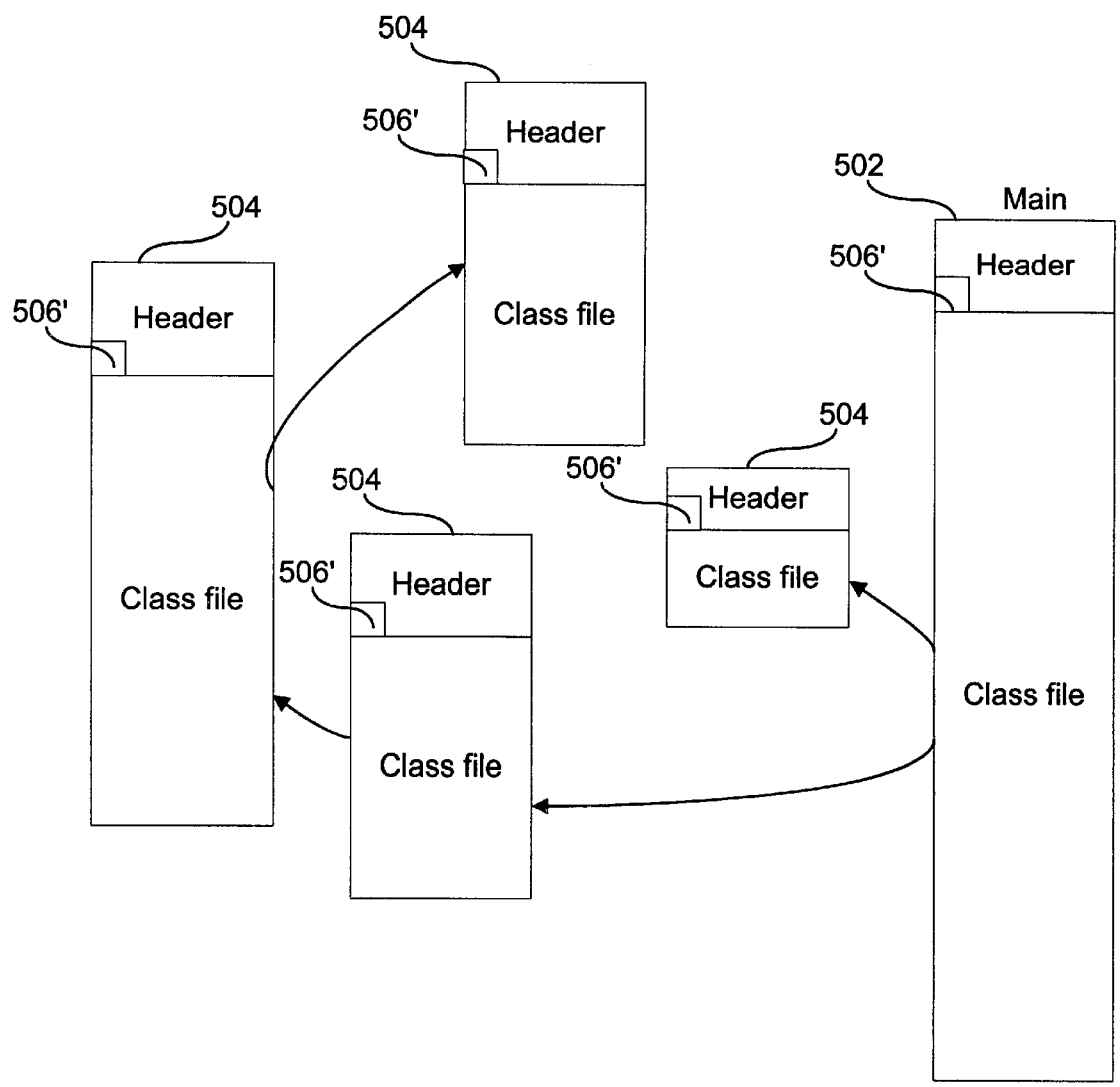
FIG. 5(b) is a diagram of a plurality of Java classes, where each class includes a conformance indicator in accordance with one embodiment of the present invention.

In step 202, compiler 114 compiles the source code and adds an indication to platform-independent binaries 118 in accordance with the received instruction. An example of such an indication is shown in FIG. 5(a), which shows that a header bit 506 is set in the "main" class file 502 of the executable program. The terms "class" and "class file" are well-known to persons familiar with the Java programming language. FIG. 5(b) shows a second example of an indication. In FIG. 5(b), a header bit 506' is set in a header for each class file in the executable program. In the described embodiment, both compiler 114 and conformance software 136, 148 are designed to set and read the same type of indicator. For example, compiler 114 sets bit 506 as shown in FIG. 5(a) and conformance software 136 checks for the bit 506 in the main class file.

Alternatively, a system can have several different possible types or formats of indicators (e.g., different types and formats of indicators in various versions of the compiler or conformance software). To ensure compatibility between the various types and formats of indicators, compiler 114 can set various types and/or formats of indicators, depending on settings of a compiler switch (not shown). Similarly, conformance software 136, 148 can check various types and/or formats of indicators, depending on setting of bits or flags (not shown) in systems 130 and 140. Similarly, conformance software 136, 148 can check various indicators, depending on the type of binary file to be validated. For example, Java class files may set a certain bit as an indicator, while ActiveX files may use a different bit as an indicator.

Step 202 produces platform-independent binaries 118 that includes an indicator alleging that platform-independent binaries 118 conforms to a platform standard. Platform-independent binaries 118 are transferred (in any appropriate manner) to remote server 104, which stores binaries 118 in memory until the plafform-independent binaries are requested by, for example, intranet 106. This request may be any appropriate type of request, such as an http request sent by intranet 106 when a user presses a button in a Web page displayed by runtime environment 140.

In step 204, remote server 104 sends platform-independent binaries 118 to firewall 130 of intranet 106.

Firewall 130 performs step 230 after platform independent binaries 118 are transferred to storage area 134 of the firewall. Firewall 130 executes conformance software 136 to determine whether platform-independent binaries 118 have an indication that they conform to a predetermined platform standard (such as the "Pure Java" standard). If platform-independent binaries 118 contain such an indication, they are passed through the firewall, as described in detail below in connection with FIG. 6.

Runtime environment 140 performs step 240 after executable software 118 is transferred to storage area 144 of the system 140. Runtime environment 140 optionally executes conformance software 148 to determine whether plafform-independent binaries 118 have an indication that they conform to a predetermined platform standard (such as the "Pure Java" standard). If the platform-independent binaries contain such an indication, they are executed, as described in detail below in connection with FIGS. 7 and 8.

An alternative embodiment of conformance software 148 in the runtime environment also checks that platform-independent binaries 118 actually conform to the standard (as opposed to simply indicating that they conform). This additional check is also discussed in detail below in connection with FIGS. 7 and 8.

Figure 3:
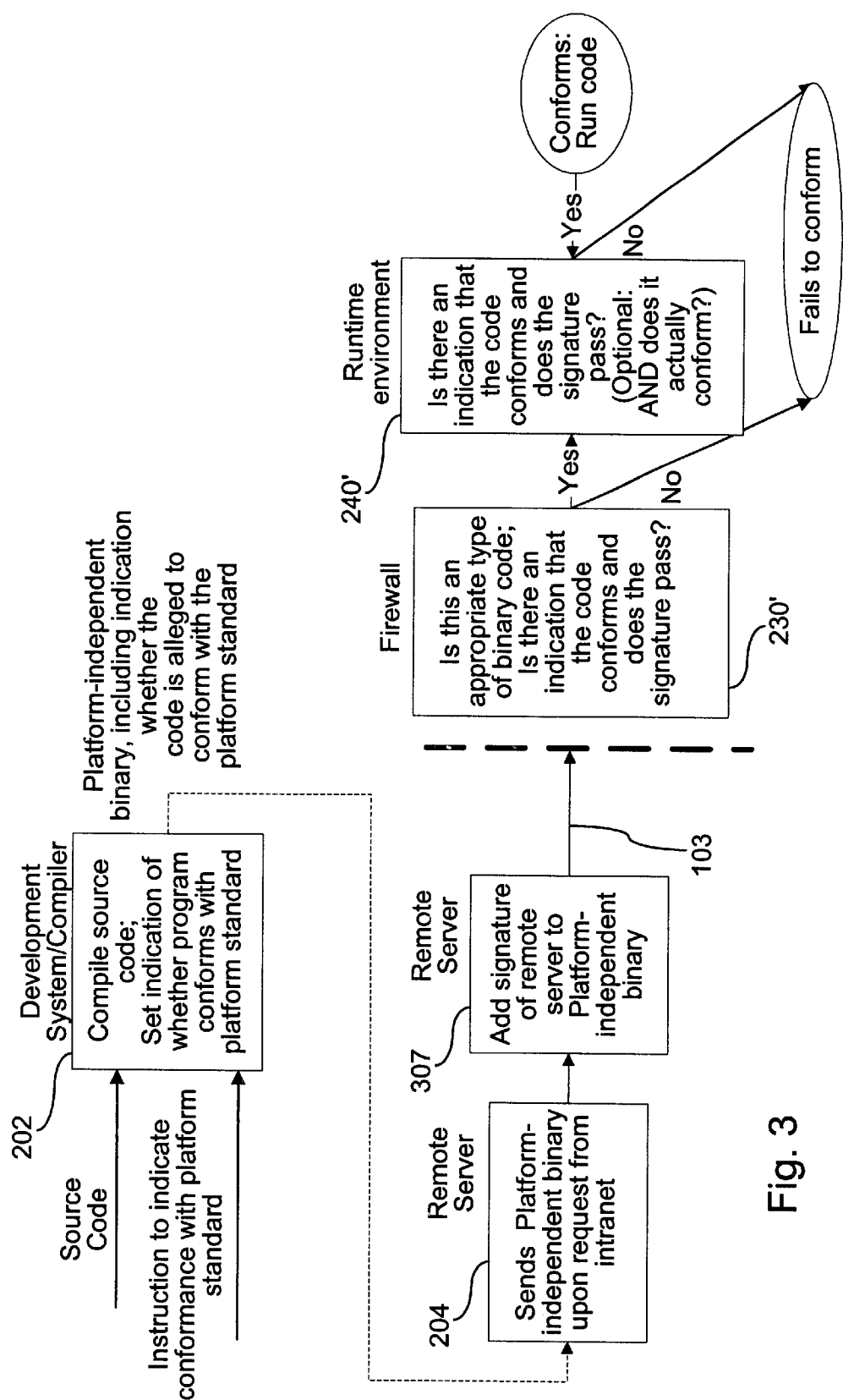
FIG. 3 shows steps performed by a development system, a remote server, and a runtime system in accordance with one embodiment of the present invention that includes a signature check of program code.

FIG. 3 shows steps performed by development system 102, remote server 104, and intranet 106 in accordance with another embodiment of the present invention that includes a digital signature check of program code. Steps 202, 204, 230', and 240' are similar to the steps described in connection with FIG. 2. FIG. 3, however, shows additional steps relating to public key signatures. In one embodiment of the present invention, each remote server has a well-known public key and a secret private key. Whenever a remote server 104 sends platform-independent binaries to a requester, such as intranet 106, remote server 104 signs the platform-independent binaries with its-private key, as shown in step 307.

In steps 230' and 240', conformance software 136 and 148 decrypt the signature using a public key belonging to remote server 104 (because the binaries 118 were requested from remote server 104). If the decrypted signature matches a signature for remote server 104 stored in memory, the conformance software determines that executable software actually was sent by remote server 104. In an alternative embodiment, only one of conformance software 136, 148 decrypt the received signature. In yet another embodiment, the conformance software 136 and/or 148 checks the received signature against a plurality of public keys (e.g., all public keys of trusted remote servers). If the decrypted signature matches, the remote server is validated as conforming.

Figure 6:
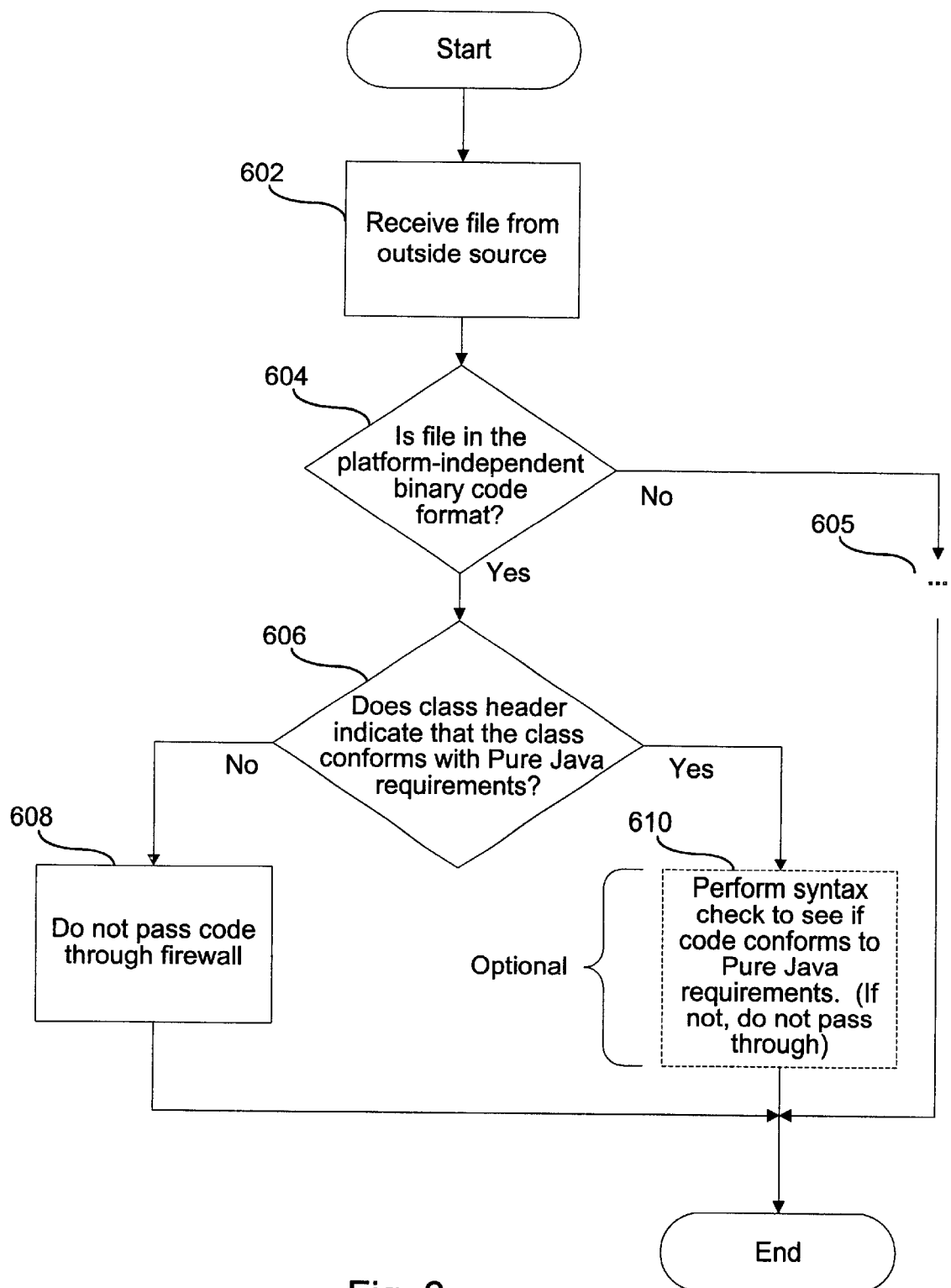
FIG. 6 is a flow chart of steps performed by a firewall system when it receives program code from a source outside the firewall in accordance with one embodiment of the present invention.
Figure 7:
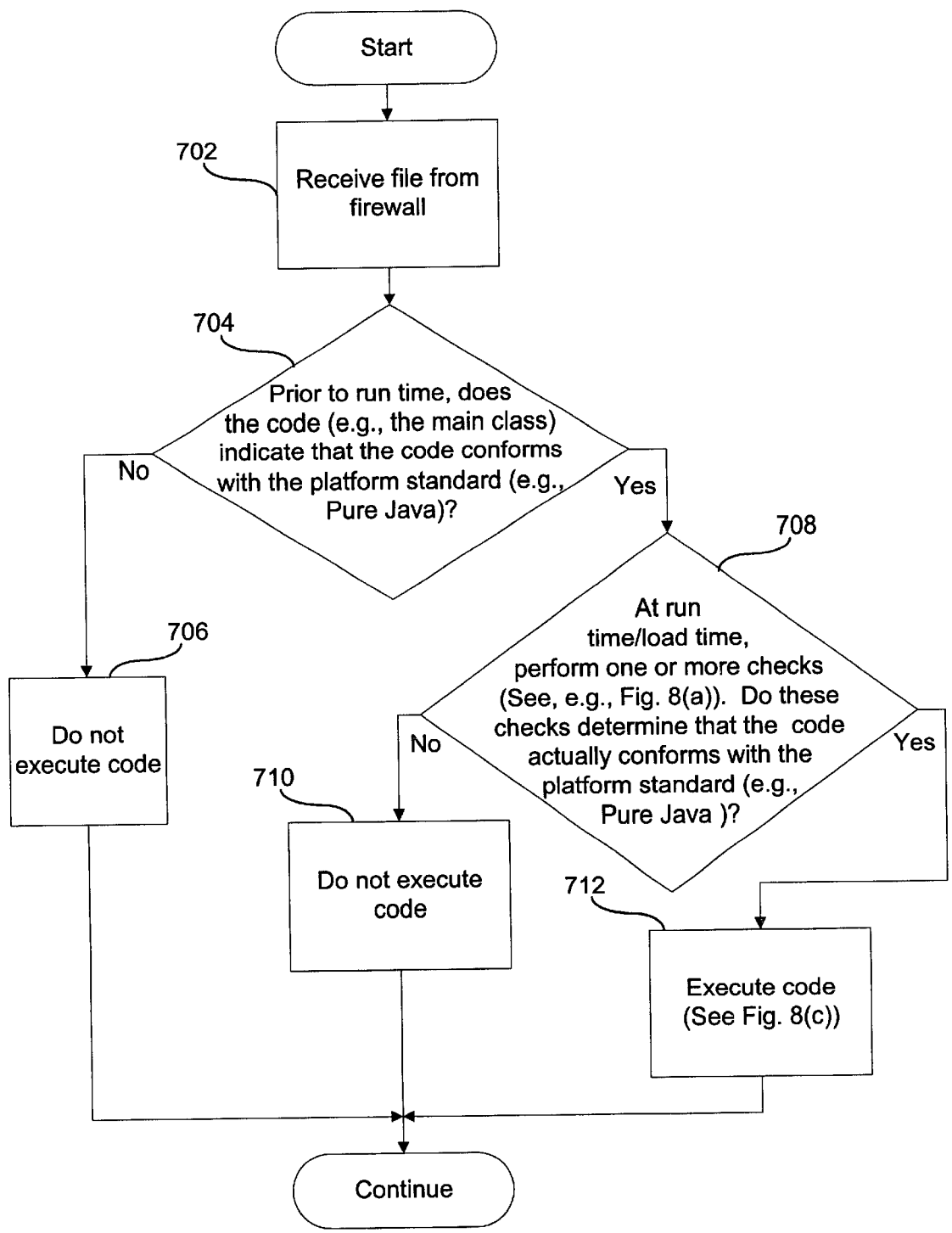
FIG. 7 is a flow chart of steps performed by a runtime environment when it receives program code from the firewall in accordance with one embodiment of the present invention.

The previous paragraphs provide an overview of several embodiments of the present invention. FIGS. 4–10 disclose additional details of these and other embodiments. FIGS. 4(a) and 4(b) relate to development system 102. FIG. 6 relates to firewall 130. FIGS. 7 and 8 relate to runtime environment 140.

FIG. 3, as discussed above, shows an embodiment in which compiler 114 receives an indication from a human programmer (or some other external source) that the code being compiled conforms to a platform standard. FIGS. 4(a) and 4(b) show alternative steps performed by development system 102 to set an indicator of platform standard conformance.

In FIG. 4(a), compiler 114 checks the code being compiled to determine whether the code contains a statement, indication, or codeword that it conforms to a platform standard, such as the 100% Pure Java standard. If compiler 114 finds the statement, indication, or codeword, it sets an indicator in binaries 118.

In FIG. 4(b), compiler 114 performs a check to determine whether platform-independent binaries 118 actually are in conformance with the platform standard, such as the 100% Pure Java standard, before setting an indicator in binaries 118. Such a determination can be made, for example, as shown in FIGS. 7 and 8 below.

Sun Microsystems, Inc. manufactures PureCheck software that performs a static check of the conformance of Java code to the Pure Java platform standard. The PureCheck software is described at:

http://www.suntest.com/100percent/cpd/doc/tools/JavaPureCheck.html.

This Web page is hereby incorporated by reference in its entirety. Rules used by a current implementation of PureCheck are described at the following Web page, which is included by way of example and not as a limitation. The data located at the following URLs describe rules associated with PureCheck for Java 1.0 and Java 1.1, respectively, and are herein incorporated by reference in their entirety:

http://www.suntest.com/100percent/cpd/doc/tools/jdk102.html and http://www.suntest.com/100percent/cpd/doc/tools/jdk11.html FIG. 6 is a flow chart of steps performed by a firewall system when it receives a file that might possibly be a file of the sort being checked for conformance to the platform standard from a source outside the firewall, as shown in step 602. Specifically, the steps are performed, e.g., by conformance software 136. In the example of FIG. 6, conformance software 136 determines whether the received program code conforms to the 100% Pure Java platform standard. In step 604, if the file is in the plafform-independent binary code format (e.g., if the program file is a Java class file, a Java Archive (JAR) file, or other appropriate program file), control passes to step 606. For example, Java class files currently contain the hexadecimal four-bit value "cafebabe" in a predetermined position in their header. Any file not containing that value in the predetermined position cannot be a Java class file. Any appropriate method of testing the format of received code can be employed in step 604. If the file is not in a platform-independent binary code format, control passes to various other tests 605 (not shown in detail) that the firewall performs on such files. These files may or may not ultimately be passed through the firewall.

In step 606, if the received plafform-independent binary does not include an indication that it conforms to the platform standard (e.g., that bits 506 of FIGS. 5(a) or 5(b) are set), the firewall does not pass the plafform-independent binaries through to the runtime system (step 608). In contrast, if the binaries 118 do include such an indication, control passes to step 610. Step 610 is an optional step that is performed in at least one embodiment of the present invention. In step 610, software 136 performs a check to determine whether the received binary 118 conforms to the platform standard. For example, software 136 might determine whether a class name is a class name allowed by the standard.

If plafform-independent binaries 118 are found to pass the conformance test, they are sent to runtime environment 140 in step 610. Thus, platform-independent binary code that does not conform to the platform standard is not allowed to enter the intranet 106.

FIGS. 7 and 8 are flow charts of steps performed by runtime environment 140 when it receives program code to be checked for conformance from the firewall. FIG. 7 shows an overview of two types of determinations made by conformance software 148. In step 702, the binaries 118 are received from firewall 130. Prior to run time, in step 704, software 148 determines whether platform-independent binaries 118 contain an indicator that the platform-independent binaries conform to the platform standard.

Performance of this check by the user system is valuable if, for example, the binary has entered the user system through some route other than through the firewall. If the system is using the data structures shown in FIG. 5(a), for example, the software 148 checks the header of the main class. If the header contains an indicator 506, control passes to step 708. Otherwise, in step 706, conformance software 148 refuses to execute the software. In at least one embodiment (not shown), conformance software 148 may send a message to an entity responsible for conformance of software on intranet 106, indicating that the firewall has detected non-conforming code. In an alternative embodiment, conformance software 148 may send a message to remote server 104 indicating that a non-conforming program was received.

Step 708 represents various test performed during execution of platform-independent binaries 118. Certain implementations of the present invention may load all classes before execution. In contrast, a current implementation loads classes incrementally, as each new class is needed during execution. In the first case, it is possible to check all classes after loading, but before execution of any class.

In the case of incremental loading, each classes can be checked after it is loaded, but prior to its execution. At run time, conformance software performs various determinations to confirm that the class about to be loaded (or the instruction about to be executed) conforms to the platform standard. If non-conformance is found, execution halts (and an optional message is sent). Some embodiments may also log the results of conformance testing by one or more of software 136, 148.

Figure 8A:
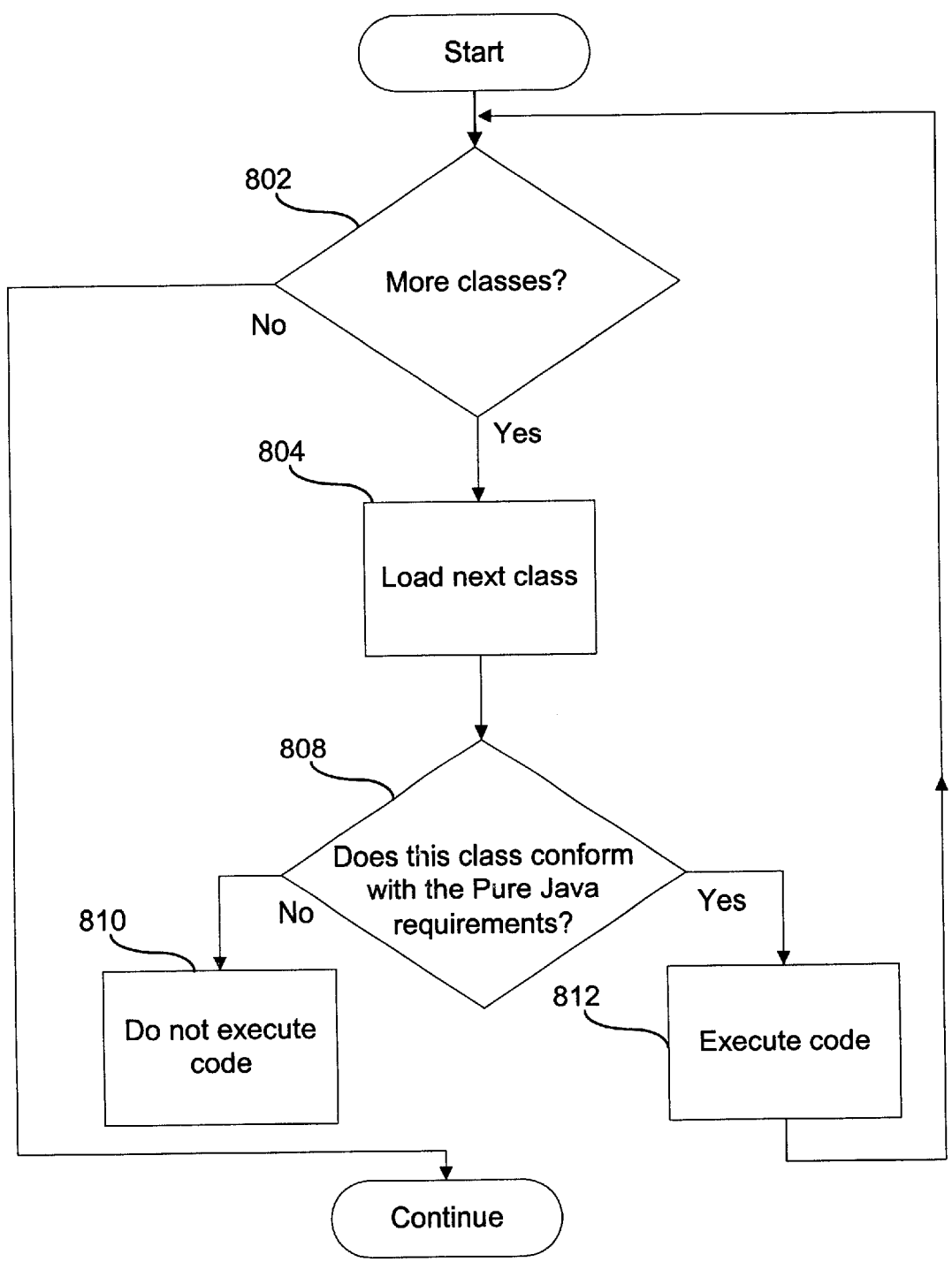
FIG. 8(a) is a flow chart of steps performed by a runtime environment prior to executing the received code in accordance with one embodiment of the present invention.

It should be understood that step 708 of FIG. 7 can include any appropriate conformance testing. The definition of appropriate conformance testing can vary, depending, for example, on the language or platform being tested for conformance. FIG. 8(a) shows further details of step 708 of FIG. 7. The steps of FIG. 8(a) are performed in an implementation of the present invention that conformance tests Java programs for conformance with the Pure Java platform standard. Additional or different tests can be used without departing from the spirit of the present invention. The steps of FIG. 8(a) can be performed for at least a main class of platform-independent binaries 118. Alternately, the steps can be performed for each class in platform-independent binaries 118. In step 808, if the class conforms to the platform standard, execution continues. Otherwise, execution is halted as described above.

Figure 8B:
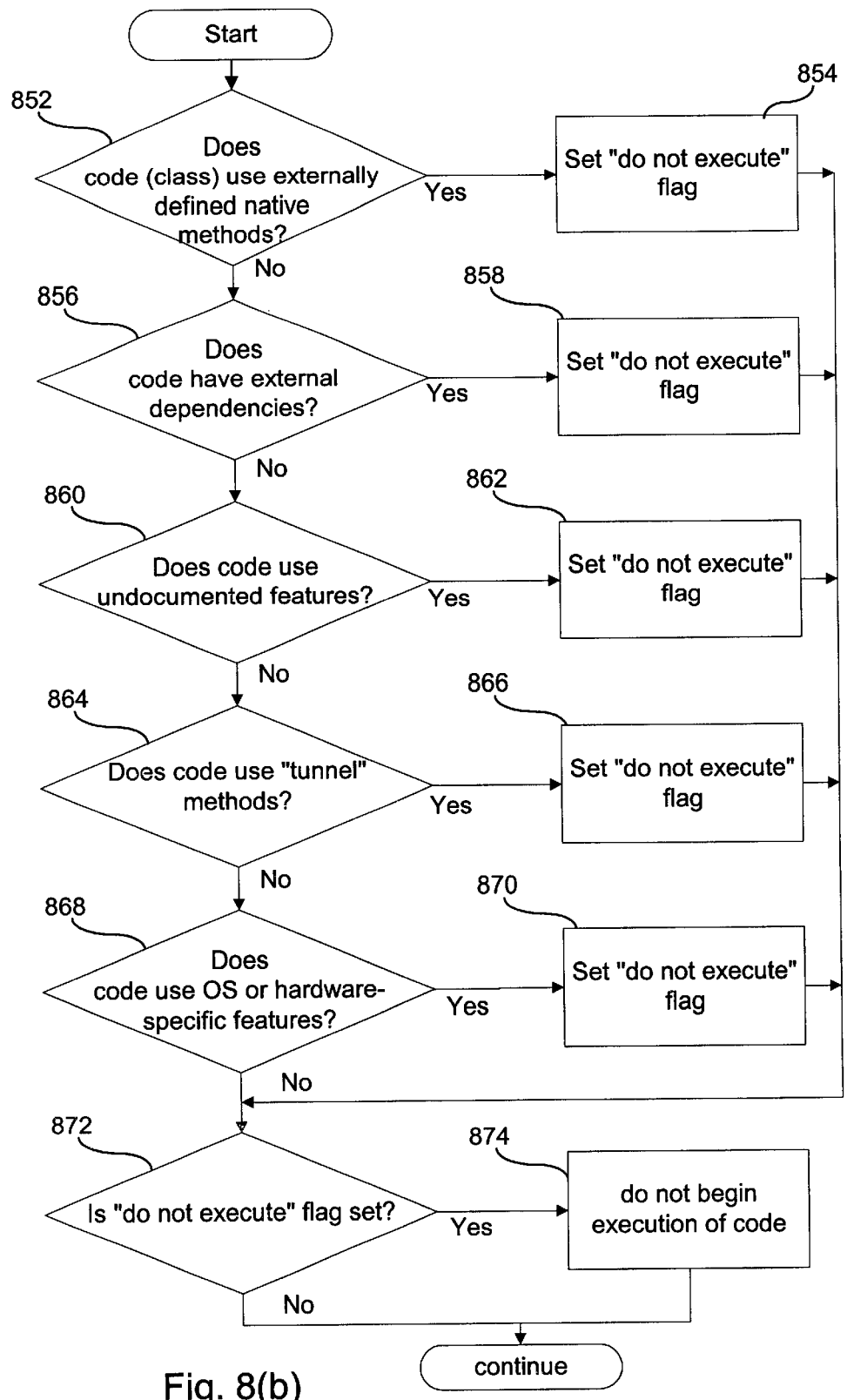
FIG. 8(b) is a flow chart of steps performed by a runtime environment while executing the received code in accordance with one embodiment of the present invention.

FIG. 8(b) shows further details of step 708 of FIG. 7. The steps of FIG. 8(b) can be performed prior to execution of a main class, of each class, of each function, of each method, or of each instruction or of each arbitrary group of instructions, depending on how conformance software 148 is designed. The steps are preferably performed at load time for a class. Step 708 and the steps of FIG. 8(b) are appropriate for systems that check conformance with the Pure Java standard. Conformance software for platforms standards of other programming languages can, but may not, include step 708 or the steps of FIG. 8(b), or other appropriate steps.

The steps of FIG. 8(b) correspond to the five principles of the "Pure" Java platform standard described above. Any appropriate tests that correspond to the platform standard being tested can be used without departing from the spirit and scope of the present invention.

In step 852, software 148 determines whether plafform-independent binaries 118 contain any externally defined methods. There is no way to confirm the purity of externally defined native methods. In step 856, software 148 determines whether platform-independent binaries 118 have any external dependencies. In step 860, software 148 determines whether platform-independent binaries 118 use any undocumented features of the platform. Such features are not intended for use by user-developed software and may not be dependable. In step 864, software 148 determines whether platform-independent binaries 118 use any "tunnel" methods. In step 868, software 148 determines whether platform-independent binaries 118 use operating system-specific or hardware-specific features. An example of an operating system-specific feature is a hardwired path constant in a filename. Examples of hardware-specific features might include hardwired, platform specific references such as a hard-wired reference to a clock speed of a specific platform. While it is not always possible to detect all instances of operating system-specific and hardware-specific features, there are certain cases where such features can be detected. In such cases, the conformance software will perform such a check.

Figure 8C:
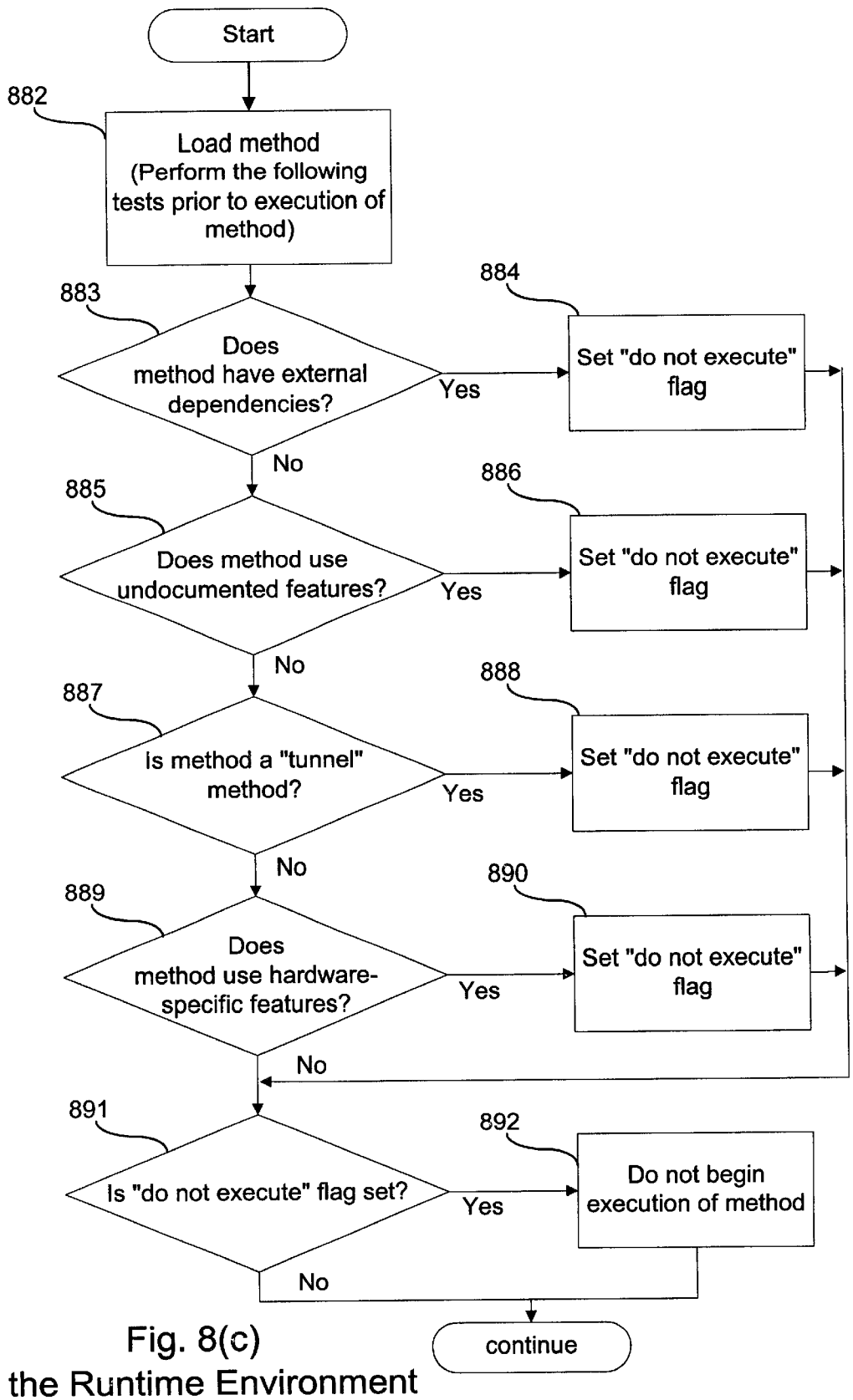
FIG. 8(c) is a flow chart of steps performed by a runtime environment prior to executing the received code in accordance with one embodiment of the present invention.

FIG. 8(c) is a flow chart of steps performed by a runtime environment on methods during execution of the received code. In this embodiment, conformance checking occurs at a higher level of granularity than class granularity. The tests of FIG. 8(c) are performed, for example, on a method during incremental loading. Thus, a method might be loaded, but checking prior to execution would keep the method from executing if it was found to be non-conforming. The tests of FIG. 8(c) are similar to the tests of FIG. 8(b).

If plafform-independent binaries 118 pass all applicable tests of FIGS. 8, execution continues until complete. Otherwise, execution is halted. Optionally, the conformance software sends an error message or performs logging.

Figure 9A:
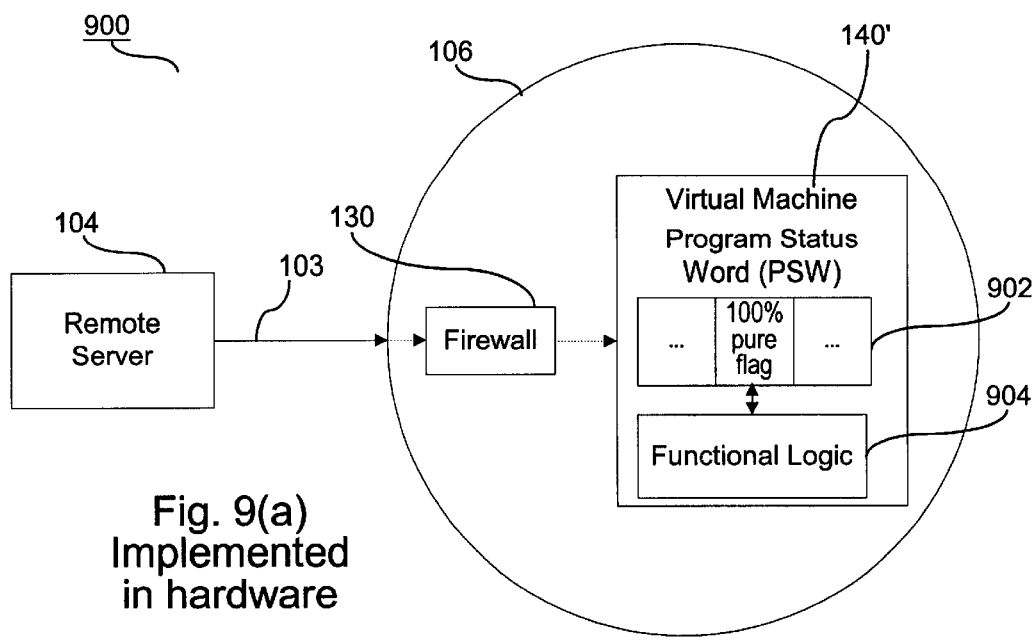
FIG. 9(a) is a block diagram showing a hardware implementation of the runtime system in accordance with one embodiment of the present invention.
Figure 9B:
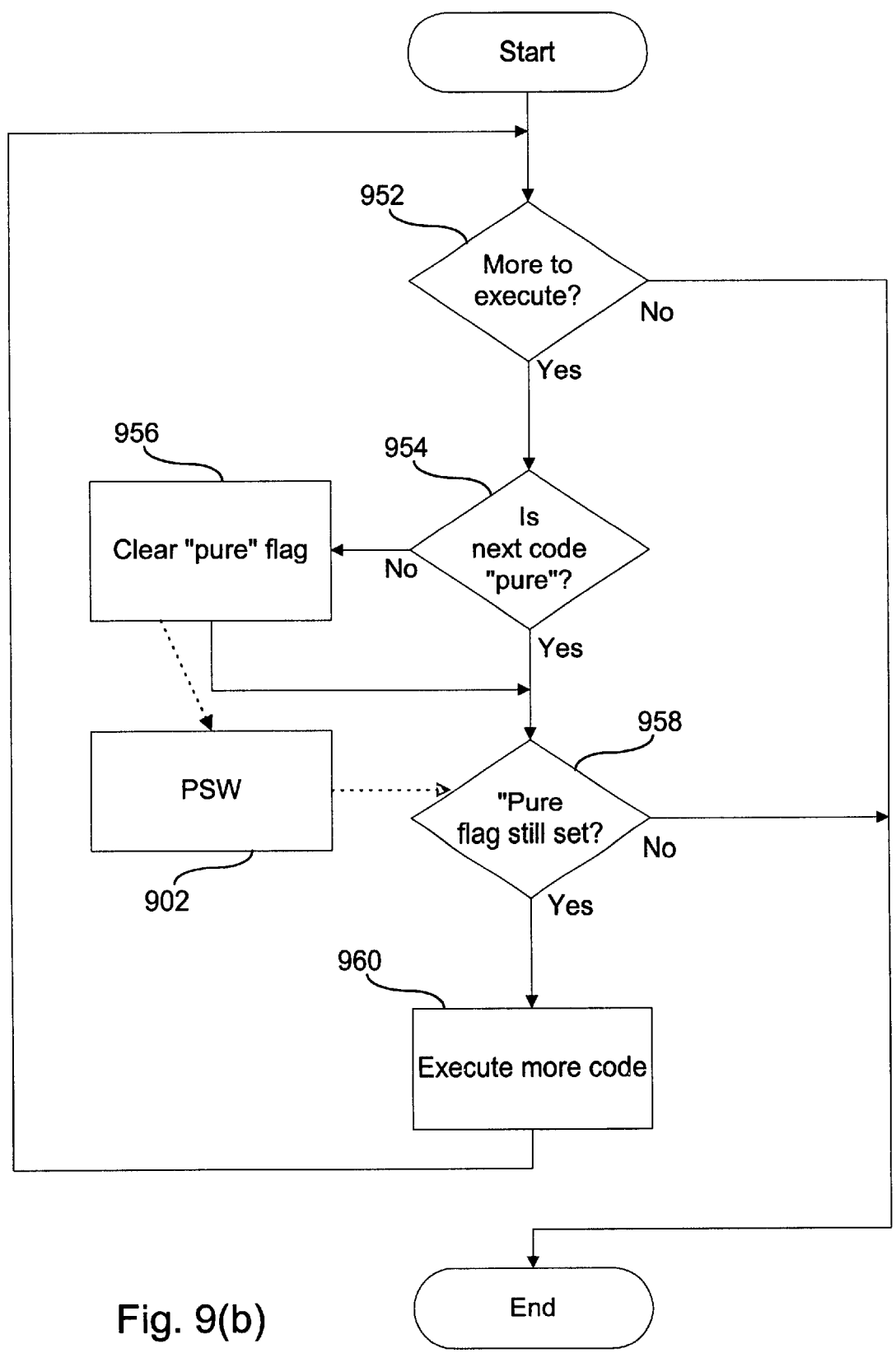
FIG. 9(b) is a flow chart showing steps performed by the hardware implementation of FIG. 9(a) in conjunction with a Program Status Word.

FIG. 9(a) is a block diagram showing a hardware implementation of the runtime system in accordance with one embodiment of the present invention. FIG. 9(b) is a flow chart showing steps performed by the hardware implementation of FIG. 9(a) in conjunction with a writable Program Status Word. FIGS. 9 and 10 envision the functionality of the runtime environment of FIGS. 1–8 embodied in a hardware implementation, such as a specialized microprocessor that executes the instruction set of the Java Virtual Machine (JVM). Such as chip may be implemented using any appropriate technology. Implementation of the virtual machine and/or conformance software 136,148 in hardware has an advantage that the conformance software is difficult to alter via outside sources. Therefore, use of hardware implementation adds to the security of the system.

The system of FIG. 9(a) includes a Program Status Word(PSW) 902 that includes a "Pure" flag. As long as this flag is set, plafform-independent binaries 118 are still determined to be in conformance with the platform standard.

FIG. 9(b) described the functionality of function logic block 904 of FIG. 9(a). In step 952, as long as there is more checking to be done, control passes to step 954. In step 954, if the next code to be executed is in conformance with the platform standard, control passes to step 958. Otherwise, if the code is not "pure," a "pure" flag in PSW 902 is cleared.

Step 958 checks the "pure" flag in PSW 902. If the flag is set, more code of plafform-independent binaries 118 are executed. Otherwise, execution is halted.

Figure 10A:
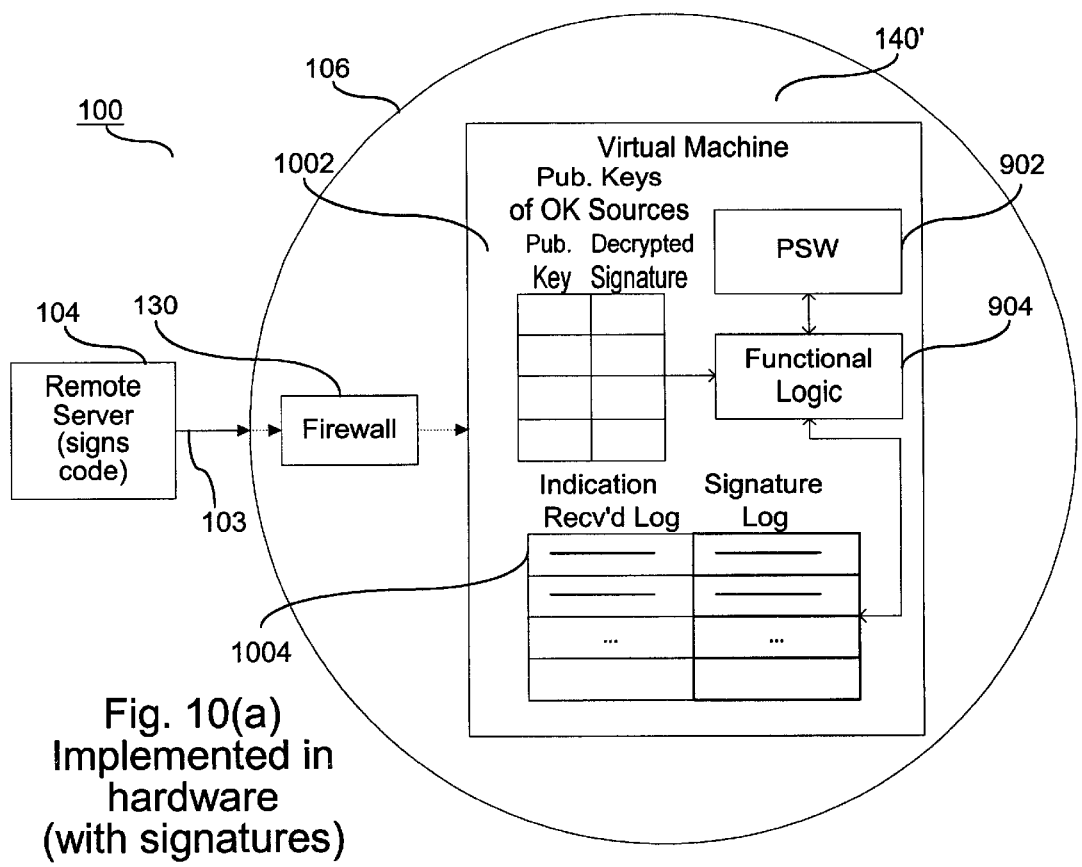
FIG. 10(a) is a block diagram showing an alternate hardware implementation of the runtime system in accordance with one embodiment of the present invention.
Figure 10B:
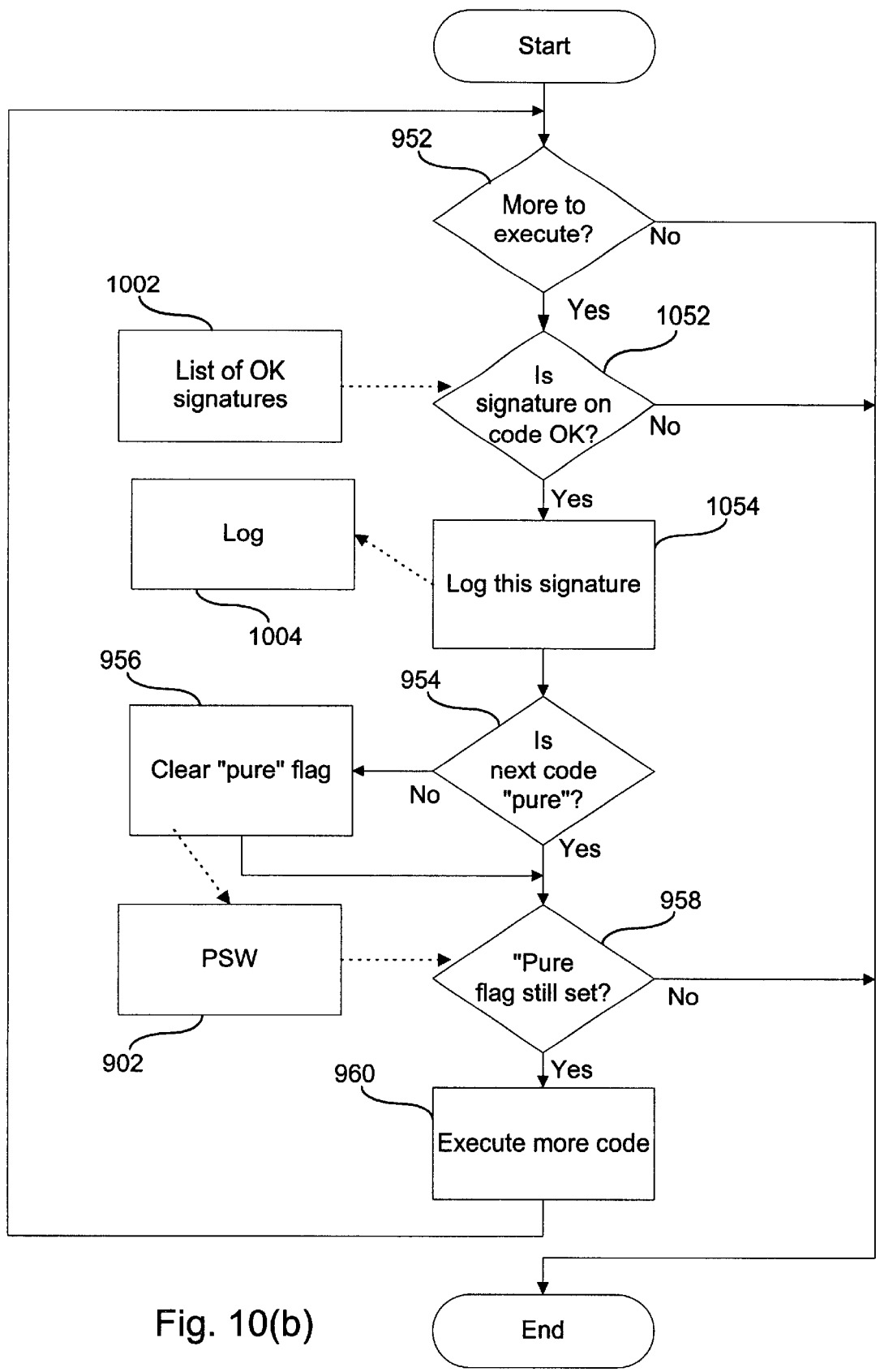
FIG. 10(b) is a flow chart showing steps performed by the hardware implementation of FIG. 10(a) in conjunction with a Program Status Word and a list of allowed signatures and corresponding public keys.

FIG. 10(a) is a block diagram showing an alternative hardware implementation of the runtime system in accordance with another embodiment of the present invention. FIG. 10(b) is a flow chart showing steps performed by the hardware implementation of FIG. 10(a) in conjunction with a program status word and a list of allowed signatures and corresponding public keys. The implementation of FIG. 10(a) includes checking a public-private key signature received from remote server 104. Thus, in addition to the PSW 902 of FIG. 9(a), FIG. 10(a) includes a list of public keys and the signatures resulting when a received signature is decrypted with the correct public key.

FIG. 10(b) described the functionality of function logic block 904 of FIG. 10(a). Most of the steps of FIG. 10(b) have been described above in connection with FIG. 9(b). In step 1052, function block 904 decrypts a signature received from remote server 104 using the public key of remote server 104 (from table 1002). If, in step 1054, the decrypted signature is the signature expected from remote server 104 (again, in accordance with table 1002), the signature is logged in log 1004. Non-accepted signatures may also be logged. The public/private key algorithm used herein can be any appropriate encryption algorithm, such as the RSA algorithm. Various suitable algorithms for implementing a digital signature are described in B. Schneir, *Applied Cryptography*, second edition, published by John Wiley & Sons, 1996, which is herein incorporated by reference in its entirety. Once the signature has been validated, block 904 continues as shown in FIG. 10(b).

In summary, the described embodiments of the present invention provides a way for a runtime environment, such as a Java virtual machine to detect whether platform-independent binaries received from a remote source conform to a platform standard, such as the "100% Pure Java" standard. The received plafform-independent binaries are passed through the firewall and executed only when the code contains an indication that it conforms to the platform standard. Certain embodiments check that the platform-independent binaries actually do conform to the standard.

While the invention has been described in conjunction with a specific embodiment, it is evident that many alternatives, modifications and variations will be apparent to those skilled in the art in light of the foregoing description. For example, although the present invention has been described in relation to validation of conformance of programs under the Pure Java platform standard, the concept of the present invention can also be implemented to validate conformance in accordance with other platform standards, such as platform standards for C, C++, Visual Basic, or ActiveX. As long as the platform standard to which programs are to conform is described in a clear and non-ambiguous manner, a person of ordinary skill in the art will be able to adapt the invention described herein to validate conformance of programs written in languages other than Java to platform standards other than Pure Java.

Accordingly, it is intended to embrace all such alternatives, modifications and variations as fall within the spirit and scope of the appended claims and equivalents. For example, one embodiment of the present invention includes a version stamp as a part of or associated with the conformance indicator. Such a version stamp (which may also be encrypted to foil counterfeiting of the stamp) indicates that a particular computer program or class file conforms to a particular version of a platform standard. Thus, a platform standard may change over time, while still allowing the firewall and conformance software to work with various versions of the platform standard. For example, a first firewall may only let through binaries that conform to a newest version of the standard. A second version of a firewall may let through binaries that conform to the two most recent versions or that conform only to a middle version or that conform only to versions that the conformance software is capable of checking.

What is claimed is:

1. A method of verifying that a computer program written in a programming language conforms to a Java platform standard for the programming language, comprising the steps, performed by a data processing system of:
   receiving the computer program, by a firewall of the data processing system;
   determining, by the firewall, that the received computer program is a computer program of a type to be checked for conformance;
   determining whether the computer program contains an indication that it conforms to the platform standard; and
   passing the computer program through the firewall only when the computer program contains an indication that it conforms to a platform standard.

2. The method of claim 1, further comprising the steps of:
   determining, by an execution environment of the data processing system, whether the computer program contains an indication that it conforms to the platform standard; and
   executing the computer program, by the execution environment, only when both the firewall and the execution environment determine that the computer program contains an indication that it conforms to the platform standard.

3. The method of claim 1, further including, prior to the firewall receiving step, the step of:
   requesting the computer program, by a Web browser, from a source outside the firewall.

4. The method of claim 2, wherein the executing step further includes the step of:
   determining, when loading a class of the computer program, whether the class indicates that it conforms to the platform standard.

5. The method of claim 2, wherein the executing step further includes the step of:
   determining, when loading each of a plurality of classes of the computer program, whether each respective class indicates that it conforms to the platform standard.

6. The method of claim 2, wherein the executing step further includes the step of:
   determining, while loading each of a plurality of classes of the computer program, whether each respective class actually conforms to the platform standard.

7. The method of claim 2, wherein the executing step further includes the step of:
   determining, prior to execution of each of a plurality of methods of the computer program, whether each method actually conforms to the platform standard.

8. The method of claim 2, wherein the executing step further includes the step of:
   determining, prior to a execution of each of a plurality of instructions of the computer program, whether each instruction actually conforms to the platform standard.

9. The method of claim 2, wherein the executing step further includes the step of:
   determining, prior to a execution of a group of instructions of the computer program, whether each instruction in the group of instructions actually conforms to the platform standard.

10. The method of claim 2, further including the step of:
    when a class of the computer program indicates that it does not conform to the platform standard, setting an indication that the computer program should no longer be executed.

11. The method of claim 2, further including the step of:
    when at least one of a class, a method, or an instruction of the computer program actually does not conform to the platform standard, setting an indication that the computer program should no longer be executed.

12. The method of claim 2, where the execution environment determining step and the execution environment executing step are selectively performed in accordance with a "check conformance" flag value in the execution environment, where the "check conformance" flag indicates that the execution environment is to verify conformance of computer programs to the platform standard.

13. The method of claim 2, further including the step of:
    verifying conformance of, by the execution environment, an encrypted signature associated with the computer program indicating the source of the computer program.

14. The method of claim 13, where the verifying step further includes the step of verifying conformance of the signature associated with the computer program using a public key of the source of the computer program.

15. The method of claim 2, further including the steps of:
    determining prior to at least one instruction of the computer program, whether the semantics of the computer program conform to the programming platform standard; and
    executing the computer program only as long as the semantics of the computer program conform to the programming platform standard.

16. The method of claim 1, further including, prior to the firewall receiving step, the step of:
    adding an indication to the computer program that the computer program conforms to the platform standard.

17. The method of claim 16, wherein the adding step further includes the step of identifying, within the computer program, a version of the platform standard with which the computer program conforms.

18. The method of claim 2, wherein the execution environment is a Web browser capable of executing computer programs written in the programming language and implementing the platform standard, and wherein the execution environment determining step is performed by the Web browser.

19. The method of claim 1,
    wherein there are more than one version of the platform standard, wherein the indication determining step includes the step of determining a version of the platform standard to which the indication refers; and wherein the passing step includes the step of passing the computer program through the firewall only when the computer program contains an indication that the computer program conforms to a predetermined version of the platform standard.

20. The method of claim 1, where the first determining step and the passing step are selectively performed in accordance with a "check conformance" flag value in the firewall, where the "check conformance" flag indicates that the firewall is to verify conformance of computer programs to the platform standard.

21. The method of claim 1, further including the step of:
verifying conformance of, by the firewall, an encrypted signature associated with the computer program indicating the source of the computer program.

22. The method of claim 21, where the verifying conformance step further includes the step of verifying conformance of the signature associated with the computer program using a public key of the source of the computer program.

23. A computer program product including:
a computer usable medium having computer readable code embodied therein for verifying that a computer program written in a programming language conforms to a Java platform standard for the programming language, the computer program product comprising:
computer readable program code devices configured to cause a firewall computer to effect receiving the computer program;
computer readable program code devices configured to cause the firewall computer to effect determining that the received computer program is a computer program of a type to be checked for conformance;
computer readable program code devices configured to cause the firewall computer to effect determining whether the computer program contains an indication that it conforms to the platform standard; and
computer readable program code devices configured to cause the firewall computer to effect passing the computer program through the firewall computer only when the computer program contains an indication that it conforms to a platform standard.

24. The computer program product of claim 23, further comprising:
computer readable program code devices configured to cause an execution environment computer to effect determining whether the computer program contains an indication that it conforms to the platform standard; and
computer readable program code devices configured to cause the execution environment computer to effect executing the computer program only when both the firewall and the execution environment determine that the computer program contains an indication that it conforms to the platform standard.

25. The computer program product of claim 24, wherein the execution environment is a Web browser capable of executing computer programs written in the programming language and implementing the platform standard, and wherein the execution environment determining program code devices are a part of the Web browser.

26. The computer program product of claim 24, wherein the executing program code devices further include:
computer readable program code devices configured to cause a computer to effect determining, when loading a class of the computer program, whether the class indicates that it conforms to the platform standard.

27. The computer program product of claim 24, wherein the executing program code devices further include:
computer readable program code devices configured to cause a computer to effect determining, when loading each of a plurality of classes of the computer program, whether each respective class indicates that it conforms to the platform standard.

28. The computer program product of claim 24, wherein the executing program code devices further include:
computer readable program code devices configured to cause a computer to effect determining, while loading each of a plurality of classes of the computer program, whether each respective class actually conforms to the platform standard.

29. The computer program product of claim 24, wherein the executing program code devices further include:
computer readable program code devices configured to cause a computer to effect determining, prior to execution of each of a plurality of methods of the computer program, whether each method actually conforms to the platform standard.

30. The computer program product of claim 24, wherein the executing program code devices further include:
computer readable program code devices configured to cause a computer to effect determining, prior to a execution of each of a plurality of instructions of the computer program, whether each instruction actually conforms to the platform standard.

31. The computer program product of claim 24, wherein the executing program code devices further include:
computer readable program code devices configured to cause a computer to effect determining, prior to a execution of a group of instructions of the computer program, whether each instruction in the group of instructions actually conforms to the platform standard.

32. The computer program product of claim 24, further including:
computer readable program code devices configured to cause a computer to effect, when a class of the computer program indicates that it does not conform to the platform standard, setting an indication that the computer program should no longer be executed.

33. The computer program product of claim 24, further including:
computer readable program code devices configured to cause a computer to effect, when at least one of a class, a method, or an instruction of the computer program actually does not conform to the platform standard, setting an indication that the computer program should no longer be executed.

34. The computer program product of claim 24, where the execution environment determining program code devices and the execution environment executing program code devices are selectively evoked in accordance with a "check conformance" flag value in the execution environment, where the "check conformance" flag indicates that the execution environment is to verify conformance of computer programs to the platform standard.

35. The computer program product of claim 24, further including:
computer readable program code devices configured to cause a computer to effect verifying conformance of, by the execution environment, an encrypted signature associated with the computer program indicating the source of the computer program.

36. The computer program product of claim 35, where the verifying program code devices further include computer readable program code devices configured to cause a computer to effect verifying conformance of the signature associated with the computer program using a public key of the source of the computer program.

37. The computer program product of claim 24, further including:
computer readable program code devices configured to cause a computer to effect determining prior to at least one instruction of the computer program, whether the semantics of the computer program conform to the programming platform standard; and
computer readable program code devices configured to cause a computer to effect executing the computer program only as long as the semantics of the computer program conform to the programming platform standard.

38. The computer program product of claim 23,
wherein there are more than one version of the platform standard,
wherein the indication determining program code devices include program code devices configured to cause a computer to effect determining a version of the platform standard to which the indication refers; and
wherein the passing program code devices include program code devices configured to cause the firewall computer to effect passing the computer program through the firewall only when the computer program contains an indication that the computer program conforms to a predetermined version of the platform standard.

39. The computer program product of claim 23, further including:
computer readable program code devices configured to cause a computer to effect requesting the computer program, by a Web browser, from a source outside the firewall.

40. The computer program product of claim 23, further:
computer readable program code devices configured to cause a computer to effect adding an indication to the computer program that the computer program conforms to the platform standard.

41. The computer program product of claim 23, wherein the adding program code devices further include program code devices configured to cause a computer to effect identifying, within the computer program, a version of the platform standard with which the computer program conforms.

42. The computer program product of claim 23, where the first determining program code devices and the passing program code devices are selectively evoked in accordance with a "check conformance" flag value in the firewall, where the "check conformance" flag indicates that the firewall is to verify conformance of computer programs to the platform standard.

43. The computer program product of claim 23, further including:
computer readable program code devices configured to cause a computer to effect verifying conformance of, by the firewall, an encrypted signature associated with the computer program indicating the source of the computer program.

44. The computer program product of claim 43, where the verifying conformance program code devices further include computer readable program code devices configured to cause a computer to effect verifying conformance of the signature associated with the computer program using a public key of the source of the computer program.

45. A computer-readable medium carrying one or more sequences of instructions verifying that a first computer program written in a programming language conforms to a Java platform standard for the programming language, wherein execution of the one or more sequences of instructions by one or more processors causes the one or more processors to perform the steps of:
executing, by a firewall of the data processing system, a second computer program to receive the first computer program;
executing, by the firewall, the second computer program to determine that the received first computer program is a computer program of a type to be checked for conformance;
executing, by the firewall, the second computer program to determine whether the first computer program contains an indication that it conforms to the platform standard; and
executing, by the firewall, the second computer program to pass the first computer program through the firewall only when the first computer program contains an indication that it conforms to a platform standard.

46. A firewall system that verifies that a computer program written in a programming language conforms to a Java platform standard for the programming language, comprising:
a portion of the firewall system that receives the computer program from a source outside the firewall;
a portion of the firewall system that determines whether the received computer program is a computer program of a type to be checked for conformance;
a portion of the firewall system that determines whether the computer program contains an indication that it conforms to the platform standard; and
a portion of the firewall system that passes the computer program through the firewall only when the computer program contains an indication that it conforms to a platform standard.

* * * * *

UNITED STATES PATENT AND TRADEMARK OFFICE
CERTIFICATE OF CORRECTION

PATENT NO. : 6,418,444 B1  
DATED : July 9, 2002  
INVENTOR(S) : Raduchel et al.

It is certified that error appears in the above-identified patent and that said Letters Patent is hereby corrected as shown below:

Title page,
Item [54], Title, change "EXCUTION" to -- EXECUTION --

Column 7,
Lines 52, 54 and 64, change "plafform-independent" to -- platform-independent --.

Column 8,
Line 8, change "plafform-independent" to -- platform-independent --.

Column 10,
Lines 10 and 29, change "plafform-independent" to -- platform-independent --.

Column 11,
Lines 21, 52 and 65, change "plafform-independent" to -- platform-independent --.

Column 12,
Lines 1 and 11, change "plafform-independent" to -- platform-independent --.

Column 13,
Lines 21 and 53, change "plafform-independent" to -- platform-independent --.

Column 14,
Lines 7, 16 and 52, change "plafform-independent" to -- platform-independent --.

Signed and Sealed this

Eleventh Day of November, 2003

JAMES E. ROGAN
*Director of the United States Patent and Trademark Office*